US012752478B2

(12) United States Patent
Krieglsteiner et al.

(10) Patent No.: US 12,752,478 B2
(45) Date of Patent: Oct. 6, 2026

(54) METHODS AND DEVICES FOR PRODUCING THREE-DIMENSIONAL SHAPED OBJECTS

(71) Applicant: Liqtra GmbH, Hamburg (DE)

(72) Inventors: Joscha Krieglsteiner, Hamburg (DE); Matthias Behr, Buxtehude (DE)

(73) Assignee: Liqtra GmbH, Hamburg (DE)

( * ) Notice: Subject to any disclaimer, the term of this patent is extended or adjusted under 35 U.S.C. 154(b) by 300 days.

(21) Appl. No.: 18/003,551

(22) PCT Filed: Jun. 30, 2021

(86) PCT No.: PCT/EP2021/068066
§ 371 (c)(1),
(2) Date: Dec. 28, 2022

(87) PCT Pub. No.: WO2022/003055
PCT Pub. Date: Jan. 6, 2022

(65) Prior Publication Data

US 2023/0241834 A1 Aug. 3, 2023

(30) Foreign Application Priority Data

Jun. 30, 2020 (DE) ..................... 10 2020 117 248.6

(51) Int. Cl.
*B29C 64/118* (2017.01)
*B29C 64/209* (2017.01)
(Continued)

(52) U.S. Cl.
CPC .......... *B29C 64/118* (2017.08); *B29C 64/209* (2017.08); *B29C 64/232* (2017.08); (Continued)

(58) Field of Classification Search
CPC ... B29C 64/118; B29C 64/209; B29C 64/232; B29C 64/236; B29C 64/393; B33Y 30/00
See application file for complete search history.

(56) References Cited

U.S. PATENT DOCUMENTS

| | | | |
|---|---|---|---|
| 8,827,684 | B1 | 9/2014 | Schumacher et al. |
| 10,500,792 | B2 | 12/2019 | Mantell et al. |

(Continued)

FOREIGN PATENT DOCUMENTS

| | | |
|---|---|---|
| EP | 3414521 | 12/2018 |
| WO | 2015/153400 | 10/2015 |

(Continued)

OTHER PUBLICATIONS

International Search Report dated Dec. 2, 2021, in PCT/EP2021/068066, with English translation, 13 pages.

(Continued)

*Primary Examiner* — Galen H Hauth
*Assistant Examiner* — Mohamed K Ahmed Ali
(74) *Attorney, Agent, or Firm* — Grüneberg Global IP, PLLC

(57) ABSTRACT

An additive manufacturing method is disclosed in which an extrusion material is applied to a printing surface by a printhead in a plurality of layers arranged one on top of another along a z-axis, and relative movements in an x-axis and/or a y-axis of an x,y-axis plane extending perpendicular to the z-axis are performed between the printhead and the printing surface during the application. The method includes varying the swath width of the extrusion material extruded through one or more extrusion apertures of the printhead on the printing surface or one of the layers disposed thereon in response to the movement direction. Further disclosed are an associated computer-implemented method for 3D printing, associated 3D printheads, and an associated 3D printing apparatus.

15 Claims, 10 Drawing Sheets

(51) Int. Cl.

| | |
|---|---|
| ***B29C 64/232*** | (2017.01) |
| ***B29C 64/236*** | (2017.01) |
| ***B29C 64/393*** | (2017.01) |
| ***B33Y 10/00*** | (2015.01) |
| ***B33Y 30/00*** | (2015.01) |
| ***B33Y 50/02*** | (2015.01) |

(52) U.S. Cl.
CPC .......... *B29C 64/236* (2017.08); *B29C 64/393* (2017.08); *B33Y 10/00* (2014.12); *B33Y 30/00* (2014.12); *B33Y 50/02* (2014.12)

(56) References Cited

U.S. PATENT DOCUMENTS

| | | | | |
|---|---|---|---|---|
| 2009/0258099 | A1 | 10/2009 | Brown et al. | |
| 2014/0048970 | A1* | 2/2014 | Batchelder | B29C 64/106 264/129 |
| 2016/0311159 | A1 | 10/2016 | Spanier et al. | |
| 2016/0325498 | A1 | 11/2016 | Gelbart | |
| 2017/0157828 | A1 | 6/2017 | Mandel et al. | |
| 2017/0157831 | A1* | 6/2017 | Mandel | B29C 64/106 |
| 2019/0030819 | A1 | 1/2019 | Mantell et al. | |
| 2019/0152154 | A1* | 5/2019 | Mantell | B29C 64/227 |
| 2019/0322044 | A1 | 10/2019 | Susnjara et al. | |
| 2020/0086562 | A1 | 3/2020 | Mantell et al. | |

FOREIGN PATENT DOCUMENTS

| | | |
|---|---|---|
| WO | 2017/139332 | 8/2017 |
| WO | 2017/215641 | 12/2017 |

OTHER PUBLICATIONS

Written Opinion dated Dec. 2, 2021, in PCT/EP2021/068066, with English translation, 23 pages.

* cited by examiner

METHODS AND DEVICES FOR PRODUCING THREE-DIMENSIONAL SHAPED OBJECTS

CROSS-REFERENCE TO RELATED APPLICATIONS

This application is the National Stage entry under § 371 of International Application No. PCT/EP2021/068066, filed on Jun. 30, 2021, and which claims the benefit of priority to German Application No. 10 2020 117 248.6, filed on Jun. 30, 2020. The content of each of these applications is hereby incorporated by reference in its entirety.

BACKGROUND OF THE INVENTION

Field of the Invention

The present invention relates to methods and devices in the field of additive manufacturing processes, also referred to as 3D printing, in particular in the field of so-called fused layer processes such as "Fused Layer Modeling" (FLM) or "Fused Deposition Modeling" (FDM) or "Fused Filament Fabrication" (FFF).

Description of Related Art

Additive manufacturing methods or 3D printing generally refer to manufacturing processes in which a material is applied layer by layer to a surface and in this way three-dimensional objects (hereinafter also referred to as "shaped objects" or "workpieces") are successively produced.

A typical 3D printer is an electromechanical device with a printhead, a printing platform or surface, respectively, and mechanical actuators, with the aid of which the printhead can be moved relative to the printing surface along the x, y and/or z axis of a Cartesian coordinate space. The printhead is configured to discharge the material from one or more apertures or nozzles, respectively, toward the printing surface during the method to produce the individual layers. This process is hereinafter also referred to as "extruding" or "extrusion" and the material accordingly as "extrusion material".

The build-up in layers is usually computer-controlled according to specified dimensions and shapes based on a digital model of the object to be produced.

To create a layer, the printhead usually traverses a working plane parallel to the x- and y-axes and, during this process, the material is applied to the surface through the printhead at defined positions along a print path in order to form contour, inner and/or support areas. Between two successive layers, the distance between the printhead and the surface is increased in the z-axis so that the layers are "stacked" on top of each other along the z-axis. The individual layers subsequently combine to form a complex shaped object.

The disadvantages of conventional 3D printing processes include a relatively low build-up speed and correspondingly long production times of many hours to several days, which can also result in high production costs for the workpieces.

Various proposed solutions for accelerating 3D printing by increasing the material throughput are known in the prior art. One possibility involves increasing the number of nozzles of the printhead in order to increase the material throughput by simultaneous use of several nozzles.

US 2016/0325498 A1 discloses a 3D printing device based on a two-dimensional multi-nozzle printhead with a grid-like offset nozzle arrangement. U.S. Pat. No. 8,827,684 B1 discloses a 3D printer in which four multi-nozzle printheads are fixedly arranged around a central middle axis. Further multi-nozzle printheads with a one- or two-dimensional nozzle arrangement are known, for example, from WO 2015/153400 A1.

Another solution is to use multi-nozzle printheads that can be rotated during material extrusion to increase the flexibility of nozzle use during the printing process, thereby further accelerating the 3D printing process.

US 2017/0157828 A1 and US 2017/0157831 A1 disclose devices and methods for 3D printing in which, with the aid of a rotatable printhead, the distance between the various nozzles in the printhead can be continuously varied transversely to the process direction. WO 2017/215641A1 discloses a further device for 3D printing, the printhead of which consists of a plurality of serially connected segments of nozzles arranged individually or in pairs. The segments are connected to one another via rotary bearings, thereby enabling flexible adjustment of the nozzle spacing during the printing process.

A problem is that rotatable multi-nozzle printheads are technically complex and typically associated with high control and maintenance costs. Therefore, while on the one hand an increased material throughput can be achieved with such printing devices, on the other hand significantly higher operating costs are usually incurred, so that a reduction in process time is often at the expense of the economic efficiency of 3D printing.

SUMMARY OF THE INVENTION

It is therefore an object of the present invention to provide improved methods and devices for the manufacture of three-dimensional shaped objects which at least partially solve these problems.

This object is solved by the subject matters described below. Preferred and advantageous embodiments are described further below.

According to a first aspect of the invention, a method of manufacturing a three-dimensional shaped object is provided.

The method according to the present invention predicates that an extrusion material is applied to a printing surface by a printhead in a plurality of layers arranged one above the other along a z-axis. During the application, relative movements are performed between the printhead and the printing surface in an x-axis and/or a y-axis of an x,y-axis plane extending perpendicular to the Z-axis. For example, the printhead may be moved relative to the printing surface in various directions parallel or at least partially parallel to the x,y-axis plane. The printing surface can in principle be arranged perpendicular to the z-axis or parallel to the x,y-axis plane, respectively, in which the relative movements of the printhead take place, but other arrangements with respect to the x-, y- and z-axes, are also possible, for example by tilting or inclining the printing surface. Also in other respects, the type of printing surface in the method according to the invention is not particularly limited and can be, for example, a printing platform, a printing table or any other suitable substrate, including another workpiece or part thereof. The relative movement of the printhead with respect to the printing surface can in principle be realized herein by a movement of the printhead or a movement and/or rotation of the printing surface, as well as by combinations thereof.

Furthermore, the method according to the present invention predicates that the printhead comprises, on an output side facing the printing surface, at least one linearly extending aperture row comprising two or more extrusion apertures for extruding the extrusion material. Preferably, the printhead has a plurality of extrusion apertures, wherein in preferred embodiments the linearly extending aperture row comprises, or is formed of, at least three, at least four, at least five or more extrusion apertures for extruding the extrusion material, which are particularly preferably evenly spaced from each other. With reference to the orientation of the aperture row in the x,y-axis plane, the printhead is aligned in a setting angle α in the x,y-axis plane. As the term is used herein, the "setting angle" defines in particular the angle which with respect to the x,y-axis plane is present in the mathematically positive direction of rotation between the x-axis and the linearly extending aperture row.

The method according to the present invention comprises the following steps: A) performing a relative movement with a first setting angle α of the printhead in a first movement direction with simultaneous extrusion of the extrusion material through at least two extrusion apertures of the aperture row, B) performing a relative movement with the first setting angle α of the printhead in a second movement direction deviating from the first movement direction with simultaneous extrusion of the extrusion material through the at least two extrusion apertures of step A).

As the terms are used herein, "first movement direction" and "second movement direction" are to be understood as two different directions of movement, that is, the printhead is moved in different directions in steps A) and B). Accordingly, "first setting angle α" is to be understood as the same setting angle α in steps A) and B), that is, the first setting angle α is maintained unchanged while steps A) and B) are performed. In other words, the method comprises performing a change of direction of the printhead movement with an unchanged setting angle α of the printhead. The relative movement in steps A) and B) may be the same relative movement, in particular a nonstop or continuous relative movement, or two separate movements, for example a first relative movement in step A) and a second relative movement in step B). In this context, the method provides both the possibility of the printhead being adjustable in the first setting angle α before steps A) and B) are carried out or outside operation, respectively, for example in order to adjust the setting angle to the shape of the object to be produced, and the possibility of the setting angle of the printhead being technically predetermined and not being variable, i.e. the printhead in particular does not have an own axis of rotation.

Herein, the method according to the invention characterizes that in step B) with at least one of the at least two extrusion apertures in the second movement direction, a wider or narrower material swath of the extrusion material is applied to the printing surface and/or one of the layers arranged thereon than in the first movement direction of step A).

In this context, the inventors have recognized that a movement direction-dependent variation of the material swath width through one or more extrusion apertures of the printhead represents a previously unrecognized degree of freedom in conventional 3D printing processes with multi-nozzle printheads that involve simultaneous material extrusion through multiple extrusion apertures (hereinafter also referred to as "parallel extrusion"). By exploiting this additional degree of freedom, the inventors achieve an advantageous partial decoupling of the realizable printing direction from the printhead geometry and the printhead orientation. This enables a more flexible and efficient use of the available extrusion apertures of a 3D printhead and thereby solves, for example, the problem of producing continuous and uninterrupted material swaths or fully filled surface sections over an extended range of traversing angles without a technically complex rotation of the printhead, while simultaneously achieving a high material throughput. In this way, the number of relative movements of the printhead required to produce the shaped object can be reduced compared to conventional 3D printing methods, and the duration of the manufacturing process can be significantly shortened. In this regard, reference is also made to the detailed description of embodiments hereinafter. At the same time, the fact that the printhead does not rotate during the relative movement ensures a simple and therefore low-cost and low-maintenance technical design of the 3D printing device.

It shall be understood that also a process step C) performing at least one further relative movement with the first setting angle α of the printhead in a further movement direction deviating from the first and/or second movement direction can be carried out with simultaneous extrusion of the extrusion material through the at least two extrusion apertures from step A) and/or step B), wherein again with at least one of the at least two extrusion apertures in the further movement direction a wider or narrower material swath of the extrusion material is applied to the printing surface and/or one of the layers arranged thereon than in the first movement direction in step A) and/or the second movement direction in step B). Naturally, any other process steps according to the present invention or repetitions of steps A), B) and/or C), respectively, are also possible. The sequence of steps A) and B) and, if applicable, C) is not particularly limited. In principle, steps A), B) and/or C) can be carried out in direct succession in the process, but other variants in which further steps or further relative movements, respectively, are carried out between steps A) and B), or B) and C) are also possible.

In order to apply the wider or narrower material swath of the extrusion material, it is provided that in step B) a larger or smaller material volume of the extrusion material is extruded through the at least one of the at least two extrusion apertures in relation to the path length of the performed relative movement than in step A). In other words, in step B), the relative material discharge of the extrusion material per travel distance of the printhead from the at least one extrusion aperture is increased or decreased compared to step A).

Preferably, step B) comprises changing the discharge of the extrusion material per time through the at least one of the at least two extrusion apertures to deposit the wider or narrower material swath of extrusion material on the printing surface and/or one of the layers disposed thereon. A change in the discharge of the extrusion material per time may be an increase or a decrease in the volume and/or the mass of the extrusion material discharged per time. The discharge of the extrusion material per time is also referred to hereinafter synonymously as the material feed rate. While, in principle, the material swath width can also be varied by changing the traversing speed of the printhead at a given material feed rate, the variation of the material feed rate according to the present invention has the considerable advantage that the process time is not adversely affected, in particular when wide material swaths are produced. In this respect, reference is also made to the detailed description of embodiments hereinafter. In addition, in this embodiment according to the present invention, the extrusion apertures can be supplied with different material feed rates in order to produce different material swath widths from each other, whereas the change in the traversing speed of the printhead inevitably causes a collective change in the swath width of all extrusion apertures of the printhead.

In preferred embodiments, step B) comprises both a change in the discharge of the extrusion material per time through the at least one of the at least two extrusion apertures and a change in the traversing speed of the printhead during the relative movement, wherein in particular an increase in the discharge of the extrusion material per time can be combined with a decrease in the traversing speed of the printhead and vice versa. The inventors have realized that, in this way, it is possible to increase the dynamics of the system and advantageously compensate for any latency in the variation of the discharge of the extrusion material per time. In this way, an improved printing result is achieved. Preferably, the change in the material feed rate and the change in the traversing speed of the printhead are performed at least partially simultaneously.

In the method according to the present invention, the change of the movement direction can in principle be carried out stepwise, i.e. in one or more steps, and/or continuously or approximately continuously. In preferred embodiments, the end of the relative movement in the first movement direction in step A) simultaneously forms the beginning of the relative movement in the second movement direction in step B), i.e. the relative movements merge directly into one another. In this way, the execution of steps A) and B) results in an uninterrupted, i.e. continuous, swath of the extrusion material being applied with the extrusion apertures which extends in different directions. Similarly, increasing or decreasing the relative discharge of the extrusion material may be performed in a stepwise and/or continuous or approximately continuous manner. In preferred embodiments, a continuous or approximately continuous change in the movement direction is provided in combination with a continuous or approximately continuous increase or decrease in the relative discharge of the extrusion material per travel distance, in particular a continuous or approximately continuous increase or decrease in the discharge of the extrusion material per time. In this way, even without a technically complex rotation of the printhead, efficient nozzle utilization can be achieved over a surprisingly broad spectrum of movement directions and with corresponding savings in relative movements and process time. The ability to print within a spectrum of movement directions also makes it possible, for the first time, to produce curved contours with a multi-nozzle printhead without rotating the printhead around its own axis. A stepwise change of the movement direction and the relative material discharge, in particular a stepwise increase or decrease of the discharge of the extrusion material per time, is particularly advantageous, for example, for an efficient and time-saving generation of edges as well as filling and/or support structures.

The at least two extrusion apertures can be present in direct juxtaposition in the aperture row, i.e. no further extrusion aperture is arranged in the aperture row between both extrusion apertures. An advantage of this embodiment of the method is that, for example, during contour printing with simultaneous use of the extrusion apertures and correspondingly high material throughput, a greater range of movement directions or traversing angles can be realized in the printing geometry than is possible in a conventionally operated 3D printhead without changing the setting angle $\alpha$. Preferably, in this case the relative material discharge, in particular the discharge of the extrusion material per time, through the at least one of the at least two extrusion apertures in step B) is changed such that the material swaths applied with the two extrusion apertures parallel to each other together form, at least partially, a closed material swath surface in transverse direction to the second movement direction. Of course, it is also possible that the relative material discharge, in particular the discharge of the extrusion material per time, in step A) is adapted such that the material swaths applied with the two extrusion apertures parallel to each other together at least partially form a closed material swath surface in transverse direction to the first movement direction.

It is also possible that at least one further extrusion aperture is arranged in the aperture row between the at least two extrusion apertures, through which no discharge of extrusion material takes place in step A) and/or B). In this way, it is achieved that the range of possible directions of movement is extended by the selective discharge from selected extrusion apertures as a function of the setting angle $\alpha$ of the printhead. Furthermore, different spacings of the material swaths can be realized for given directions of movement. In combination with the adjustment of the width of the material swath, the stiffness of partially filled sections of the shaped object (e.g. filling structures) can thus be controlled in a simple and fast manner.

Naturally, combinations of the aforementioned variants are also provided, i.e. in process steps A) and B) the simultaneous discharge of the extrusion material can take place both through at least two extrusion apertures which are present in direct juxtaposition in the aperture row and through at least two extrusion apertures between which at least one further extrusion aperture of the aperture row is arranged, through which no discharge of the extrusion material takes place.

It is also possible to perform these variants one after the other, i.e. in first method steps A) and B) the at least two extrusion apertures can be, for example, in direct juxtaposition, while in second method steps A') and B') at least one further extrusion aperture of the aperture row is present between the at least two extrusion apertures or vice versa. In this way, for example, contours, filling and support structures of the shaped object can be produced particularly efficiently. Further possibilities of variation are readily apparent to the skilled artisan on the basis of this description.

In preferred method variants, a wider or narrower material swath of the extrusion material is applied to the printing surface and/or one of the layers arranged thereon in step B) with both of the at least two extrusion apertures in the second movement direction than in the first movement direction in step A), in particular wherein a larger or smaller material volume of the extrusion material is extruded in step B) through both of the at least two extrusion apertures in relation to the path length of the relative movement performed than in step A). In this way, it is achieved that the printable directions of movement and total extrusion widths can be dynamically varied over a wide range, which is hardly possible or not possible at all with conventionally operated multi-nozzle printheads without changing the setting angle $\alpha$.

In principle, the discharge of the extrusion material from the two extrusion apertures in step A) and/or in step B) and, if applicable, in further method steps can be the same or different. In preferred method variants, the discharge of the extrusion material from the two extrusion apertures in step A) and/or in step B) is adapted, in particular by adapting the material feed rate, in such a way that the swaths of the extrusion material applied to the printing surface and/or one of the layers arranged thereon by means of the two extrusion apertures have substantially the same width or differ from each other in their swath width by less than 10%, less than 7%, less than 5%, less than 3%, less than 2% or less than 1%.

It shall be understood that the features "at least one extrusion aperture" or "at least two extrusion apertures" also encompasses embodiments with two or more than two extrusion apertures, respectively. For example, it is possible that in method steps A) and/or B) a simultaneous extrusion of the extrusion material is carried out through at least three, at least four, at least five, at least six, at least seven, at least eight, at least ten or more extrusion apertures of the aperture row. Accordingly, also in step B) with a plurality of extrusion apertures of the aperture row in the second movement direction, a wider or narrower material swath of the extrusion material can be applied to the printing surface and/or one of the layers arranged thereon than in the first movement direction in step A), in particular wherein in step B) a larger or smaller material volume of the extrusion material is extruded through a plurality of extrusion apertures of the aperture row in relation to the path length of the relative movement than in step A), for example by increasing or decreasing the extrusion of the extrusion material per time.

In certain method variants, it is further provided that in step B) the simultaneous discharge of the extrusion material is effected through a smaller number of extrusion apertures of the aperture row than in step A), wherein preferably in step B) with one or more extrusion apertures in the second movement direction a wider material swath of the extrusion material being applied to the printing surface and/or one of the layers arranged thereon than in the first movement direction in step A), in particular by extruding in step B) through one or more extrusion apertures of the aperture row a greater material volume of the extrusion material in relation to the path length of the relative movement performed than in step A), e.g. by increasing the discharge of the extrusion material per time. In this way, for example, filling structures can be produced very efficiently and at the same time with a tailored stiffness. Of course, it is also possible that in step B) the simultaneous discharge of the extrusion material takes place through a larger number of extrusion apertures of the aperture row than in step A), wherein preferably in step B) with one or more extrusion apertures of the aperture row in the second movement direction a narrower material swath of the extrusion material is applied to the printing surface and/or one of the layers arranged thereon than in the first movement direction in step A).

In further method variants, it is provided that in steps A) and B) a simultaneous discharge of the extrusion material takes place through all extrusion apertures of the aperture row, wherein in step B) with each of the extrusion apertures of the aperture row in the second movement direction a wider material swath of the extrusion material is applied to the printing surface and/or one of the layers arranged thereon than in the first movement direction in step A), i.e. in step B) a larger or smaller material volume of the extrusion material is discharged through each extrusion aperture of the aperture row in relation to the path length of the relative movement performed than in step A), for example by increasing or decreasing the discharge of the extrusion material per time. This method embodiment ensures a high level of utilization of the extrusion apertures of the printhead over a wide range of movement directions, which significantly reduces the process time compared to conventionally operated 3D printheads.

The linearly extending aperture row may comprise or consist of at least three, at least four, at least five, at least six, at least seven, at least eight, at least nine, at least ten or more than ten extrusion apertures. Preferably, the aperture row comprises at most or exactly twelve, at most or exactly ten, at most or exactly eight, at most or exactly six, at most or exactly five, at most or exactly four, at most or exactly three extrusion apertures.

In preferred embodiments of the method according to the invention, it is provided that if the second movement direction extends in the x,y-axis plane at an amount-wise smaller traversing angle $\beta$ relative to the first setting angle $\alpha$ than the first movement direction, a narrower swath of the extrusion material is applied to the printing surface and/or one of the layers disposed thereon in the second movement direction. Alternatively, if the second movement direction extends in the x,y-axis plane at an amount-wise greater traversing angle $\beta$ relative to the first setting angle $\alpha$ than the first movement direction, a wider swath of the extrusion material is be applied to the printing surface and/or one of the layers disposed thereon in the second movement direction. In this way, the extrusion apertures of the printhead can be used much more efficiently and over a wider range of movement directions with the method according to the present invention than is possible with conventional operation of the printhead without changing the setting angle $\alpha$. For the purposes of the present invention, the relative traversing angle $\beta$ defines the smallest angle in the x,y-axis plane between the linearly extending aperture row and the movement direction of the printhead.

In further preferred embodiments of the method, the wider material swath in step B) has a swath width that is at least 1.1 times, at least 1.2 times, at least 1.3 times, at least 1.4 times, at least 1.5 times or at least 2.0 times the diameter of the extrusion aperture and/or the swath width of the narrower material swath. Preferably, the swath width of the wider material swath is at most 5.0 times or at most 4.0 times the diameter of the extrusion aperture and/or the swath width of the narrower material swath. Particularly preferably, the swath width of the wider material swath is in a range from 1.1 times to 2.0 times the diameter of the extrusion aperture and/or the swath width of the narrower material swath.

The method according to the present invention is not subject to any particular limitations with regard to the extrusion material and is suitable in principle for any materials known in the prior art for 3D printing, such as, for example, plastics and composites, metals or metal powders, as well as for ceramic materials, concrete or organic materials such as, for example, biopolymers, cells and combinations thereof. Preferably, the extrusion material is a molding wax or a thermoplastic, optionally fiber reinforced, such as polyethylene (PE), polypropylene (PP), polylactide (PLA), polyamide (PA), polyetheretherketone (PEEK), acrylonitrile-butadiene-styrene copolymers (ABS), polystyrene (PS), polycarbonate (PC), glycerol modified polyethylene terephthalate (PETG), polymethyl methacrylate (PMMA), polyvinyl alcohol (PVA), or a thermoplastic elastomer (TPE). Any combination of these extrusion materials is also possible.

The extrusion material can be supplied to the printhead, for example, in the form of a quasi-endless filament, which is heated and liquefied into a melt by means of a tempering device in the printhead. It is also possible that the extrusion material is already supplied to the printhead in a melt, which is produced, for example, from a filament or from a granulate of the extrusion material. Accordingly, the increase or decrease of the relative extrusion material output per movement distance of the printhead in the method according to the present invention can be performed, for example, by controlling the material feed to the printhead, with the aid of valves or by increasing or decreasing or opening and closing the extrusion apertures. For example, separate feed devices can be used for filamentary extrusion material in order to individually control the discharge of the extrusion material through each of the extrusion apertures of the aperture row, for example by means of the feed rate. Extrusion material which is already fed to the printhead in molten form can, for example, be distributed uniformly or individually to the extrusion apertures of the aperture row with the aid of a distribution means. In the case of uniform distribution, the discharge of the extrusion material through the individual extrusion apertures can be individually adjusted, for example, with the aid of valves. Further suitable options can be readily determined by the skilled artisan on the basis of the present description.

In particularly preferred embodiments, the printhead is configured according to the following fourth and/or fifth aspect of the invention.

A second aspect of the present invention relates to a computer-implemented method for controlling the manufacture of a three-dimensional shaped object.

Analogously to the first aspect, the method predicates that, for producing the three-dimensional shaped object, an extrusion material is applied to a printing surface in a plurality of layers arranged one above the other along a z-axis by means of a printhead, and relative movements in an x-axis and/or a y-axis of an x,y-axis plane extending perpendicular to the z-axis are performed between the printhead and the printing surface during the application. Again, the printhead has, on a discharge side facing the printing surface, at least one linearly extending aperture row with at least two extrusion apertures for discharging the extrusion material, the printhead being arranged with respect to the aperture row at a setting angle $\alpha$ in the x,y-axis plane.

The computer-implemented method comprises the following steps: a) receiving a digital model of the three-dimensional shaped object, b) virtually arranging the digital model on the printing surface, c) determining a printing task for applying at least part of the shaped object layer by layer on the printing surface with the printhead at the setting angle $\alpha$ on the basis of the digital model arranged according to step b), d) generating a print job as program code with program code means for executing the printing task with a computer-based control means. Analogously to the first aspect of the invention, the computer-implemented method also preferably predicates that the setting angle $\alpha$ is maintained unchanged, i.e. constant, during the execution of the printing task. In particular, the method may therefore comprise receiving a specification of the setting angle $\alpha$.

The computer-implemented method of the present invention is characterized in that in step b) an automated definition of the z-axis of the shaped object in which the layers are arranged one above the other on the printing surface and/or an automated definition of a rotation angle of the shaped object about the z-axis that orients the shaped object in the x,y-axis plane is performed. By way of clarification, an automated definition of the z-axis of the shaped object and/or an automated definition of the angle of rotation of the shaped object about the z-axis is present if step b) comprises at least one computer-determined change in the z-axis and/or the angle of rotation about the z-axis of the digital model of the three-dimensional shaped object received in step a).

In conventional generic processes, the virtual arrangement of the digital model is usually performed by the user. To the extent that a computer-assisted arrangement takes place at all in the prior art, it is generally limited to a space-saving arrangement of multiple shaped objects on the printing surface. In contrast, the computer-implemented method of the present invention links, for the first time, the specific setting angle $\alpha$ of a multi-nozzle printhead with a computer-assisted stipulation of the z-axis of the shaped object to be produced and its orientation in the x,y-axis plane. By this linkage, the inventors achieve an advantageous increase in the freedom of the system, which at least partially compensates for the supposed disadvantage that arises from a skilled artisan's point of view due to the lack of rotational freedom of the printhead. In this way, a process-optimizing arrangement of the shaped object to be produced in the printing space is achieved by aligning the shaped object in advance in such a way that several extrusion apertures can be operated simultaneously in as large areas as possible. The computer-assisted determination of this degree of freedom ensures a significant reduction in process time compared to conventional methods without automated arrangement of the shaped object in the virtual printing space.

The automated definition of the z-axis of the shaped object and/or of the angle of rotation of the shaped object about the z-axis is preferably performed iteratively, wherein a plurality of possible z-axes of the shaped object and/or a plurality of possible angles of rotation of the shaped object about the axis are determined and each evaluated using a quality function. The automated definition of the z-axis of the shaped object and/or of the angle of rotation of the shaped object about the z-axis may then be performed using that z-axis or angle of rotation that has been best evaluated by the quality function. The quality function may, for example, take into account one or more quality criteria for the layer-by-layer application of at least a portion of the shaped object on the printing surface with the printhead having the setting angle $\alpha$.

In preferred method variants, the automated definition of the z-axis of the shaped object comprises one or more of the following steps: b1) arranging the digital model on the printing surface in a first z-axis orientation, b2) defining a first projection surface by projecting one or more surface portions of the shaped object in the first z-axis orientation onto the x,y-axis plane and determining a first projection surface area, b3) arranging the digital model on the printing surface in at least a second z-axis orientation, b4) defining at least a second projection surface by projecting one or more surface portions of the shaped object in the second z-axis orientation onto the x,y-axis plane and determining a second projection surface area, b5) defining the z-axis of the shaped object based on the z-axis orientation for which the larger projection surface area has been determined.

The projection of the surface portion or surface portions onto the x,y-axis plane is preferably performed in steps b2) and/or b4) substantially parallel to the z-axis. Preferably, in steps b2) and/or b4) a sum of the projection surface areas of a plurality of surface portions of the shaped object is determined. It is of course also possible to determine in steps b2) and/or b4) the projection surface areas of all surface sections encompassed by the surface of the shaped object, that is, at least a part of the surface of the shaped object or the entire surface of the shaped object is projected onto the x,y-axis plane and the projection surface area is determined. In this way, the most favorable z-axis orientation for the production of the shaped object can be determined particularly reliably.

In further preferred method variants, the automated definition of the angle of rotation of the shaped object about the z-axis comprises one or more of the following steps: b6) determining surface elements of the shaped object each having a surface normal aligned non-parallel to the z-axis, such that a projection of the surface normal onto the x,y-axis plane and the linearly extending aperture row of the printhead define between them an inclusion angle lying in the x,y-axis plane, b7) projecting the surface normals at a first rotation angle of the shaped object onto the x,y-axis plane and amount-wise determining the inclusion angles which result in the first rotation angle in each case between the projection of the surface normals onto the x,y-axis plane and the linearly extending aperture row of the printhead, b8) projecting the surface normals in at least one second rotation angle of the shaped object onto the x,y-axis plane and amount-wise determining the inclusion angles which result in the second rotation angle in each case between the projection of the surface normals onto the x,y-axis plane and the linearly extending aperture row of the printhead, b9) defining the angle of rotation of the shaped object about the z-axis on the basis of the orientation in which for a larger proportion of the surface elements in terms of number and/or surface area an inclusion angle between the projection of the surface normal and the linearly extending aperture row of the printhead results that is amount-wise in a range from 0° to 85°. An inclusion angle of 0° means that the corresponding surface element extends at a relative traversing angle β of 90° with respect to the aperture row of the printhead. An inclusion angle of 85° means that the respective surface element extends with respect to the aperture row of the printhead at a relative traversing angle β of 5°.

In preferred embodiments, for the greater number and/or surface area of surface elements, the inclusion angle between the projection of the surface normal and the linearly extending aperture row is in the range of 45° to 85°, in the range of 55° to 85°, in the range of 65° to 85°, or in the range of 75° to 85°.

The inventors have recognized that the orientation of those surface regions of the shaped object which are not parallel to the x,y-axis plane and thus essentially determine the contours of the individual layers of the shaped object generally has a limiting effect on the parallel operability of the extrusion apertures in conventional 3D printing processes without rotation of the printhead. This problem is solved according to the present invention by minimizing the proportion of such contour-determining surface regions which are aligned almost parallel to the linearly extending aperture row of the printhead. In these surface regions, parallel extrusion is hardly possible or not possible at all, since the individual material swaths would overlap. By way of the present invention, a surprising acceleration of the 3D printing process is achieved even for simple shaped object geometries. In this regard, reference is also made to the following detailed description of embodiments.

In other preferred embodiments, for the greater number and/or surface area of surface elements, the inclusion angle between the projection of the surface normal and the linearly extending aperture row is in the range of 35° to 55°. These ranges of inclusion angle have been found to be particularly advantageous for time-saving generation of partially filled regions of the shaped object (e.g., inner regions and support regions).

In further embodiments, it is provided to base the definition of the angle of rotation on several, in particular separate, ranges of the inclusion angle. For example, the rotation angle about the z-axis can be defined on the basis of that orientation in which for a number-wise and/or surface area-wise larger proportion of the surface elements the inclusion angle between the projection of the surface normal and the linearly extending aperture row of the printhead lies in terms of magnitude in a range from 65° to 85°, 5° to 25° and/or 35° to 55°. In this way, the orientation of the shaped object in the x,y-axis plane can be adapted particularly advantageously to the printhead and shaped object geometry and the process time can be further reduced.

Preferably, in step b9) the angle of rotation is defined on the basis of the proportion of the surface elements that is larger in terms of surface area. The proportion in terms of surface area can in principle be unweighted or weighted. Preferably, the proportion in terms of surface area includes a weighting of the surface area of the surface elements based on their inclination angle relative to the x,y-axis plane. For example, the surface area proportion may be determined in step b9) by determining for each of the surface elements a normal angle $\vartheta$ which is defined between the surface normal and the z-axis, and then forming in each case a product of the surface area and the sine of the normal angle $\vartheta$ of the surface elements. By adding up the obtained products, the weighted surface area proportion of the surface elements is determined. This ensures that surface regions of the shaped object that are, for example, oriented more perpendicular to the x,y-axis plane are given greater consideration in the automated alignment of the shaped object than surface regions that are, for example, oriented more parallel to the x,y-axis plane. In this way, the alignment of the shaped object and the alignment of the aperture row in the x,y-axis plane are particularly advantageously matched with each other and a particularly effective reduction in process time is achieved.

Alternatively or additionally, automatically defining the angle of rotation of the shaped object about the z-axis may also comprise one or more of the following steps: b10) virtually arranging the digital model on the printing surface and determining at least one cross-section or several cross-sections through the shaped object parallel to the x,y-axis plane and/or at least one surface portion of the shaped object, b11) orienting the shaped object in at least two different rotation angles about the z-axis and evaluating each orientation with a quality function which takes into account at least one quality criterion for the application of at least a part of the cross-section and/or of the surface portion with the setting angle α of the printhead in the respective rotation angle, b12) defining the rotation angle about the z-axis on the basis of that orientation which has been evaluated best with regard to the quality function.

The inventors have recognized that the orientation of the shaped object in the x,y-axis plane is of key importance in a 3D printing process using a multi-nozzle printhead without its own axis of rotation, i.e., a rotationally fixed printhead. The rotation of the shaped object about the z-axis determines the orientation of its surfaces, which in turn determine the relative movements of the printhead required for printing along or parallel to the outer perimeter of a layer. Depending on the arrangement of the extrusion apertures and the setting angle α, the printhead is suitable for relative movements in different directions to varying degrees.

Each cross-section may comprise a plurality of subsections, each extending in a different direction and/or having a different length along a contour of the cross-section. Preferably, the quality criterion is considered for several subsections, in particular for several or each of the subsections that form the contour.

Suitable quality criteria can be established for one, several or all subsections of one or several layers of the shaped object or for a change from one subsection to the adjacent subsequent subsection, which can in particular include a change in direction of the relative movement of the printhead.

Suitable quality criteria can also be established for one, several or all surface sections of the shaped object or for a change between adjacent surface sections, which can in particular include a change in direction of the relative movement of the printhead, wherein the surface sections can have different surface areas. For example, the movement direction of the relative movement of the printhead during the application of a surface section or a part thereof can be determined for those surface sections which each have a surface normal aligned non-parallel to the z-axis, i.e. which are not arranged horizontally in the x,y-axis plane, wherein the movement direction of the relative movement of the printhead in the manufacturing process of the surface section extends perpendicularly to the projection of the surface normal onto the x,y-axis plane.

Quality criteria, which are established on subsections, are preferably weighted on the basis of the length of the respective subsection. Quality criteria, which are established for a change or change of direction, respectively, from one subsection to the following one, are advantageously weighted via the amount or angle, respectively, of the change of direction of the subsections or the change of direction of the relative movement of the printhead, respectively, and/or on the basis of the lengths of the respective subsections.

Quality criteria which are set up for surface sections of the shaped object are advantageously weighted on the basis of the surface area of the respective surface section. Quality criteria, which are set up for a change or change of direction from one surface section to the following one, are advantageously weighted by the amount or angle of the change of direction of the surface sections or the change of direction of the relative movement of the printhead with respect to the x,y-axis plane. It is also possible to weight the quality criteria based on the orientation of the surface normals of the surface sections, in particular based on the angles included between the surface normals and the z-axis. Furthermore, it is possible to weight the quality criteria based on the length of a common edge of adjacent surface sections.

It is understood that any combination of the above weightings is also possible.

A preferred quality criterion includes, as an evaluation parameter, the number and/or total length of relative movements of the printhead required to produce the subsection or subsections of the cross-section or the surface section. For example, the quality function may include a penalty that increases with the number and/or total length of relative movements. This is because if the arrangement of the extrusion apertures of the printhead allows parallel operation of multiple extrusion apertures only in directions of movement within a limited angular range, it may not be possible to produce each subsection of the cross-section or surface section by simultaneous extrusion from multiple extrusion apertures in a given orientation of the shaped object in the x,y-axis plane. The parallel material swaths must then be produced in these subsections individually and one after the other. The total length of the relative movements of the printhead required for this subsection is then a multiple of the length of the subsection, whereas the total length with simultaneous extrusion ideally corresponds to the single length of the subsection. The number of relative movements per subsection thus describes the quality of the orientation of the shaped object in the x,y-axis plane for a given setting angle $\alpha$ of the printhead. Moreover, the quality of the orientation of the shaped object in the x,y-axis plane can in this case be usefully evaluated by the total length of the relative movements required to produce the material swaths of one or more layers.

As a further quality criterion for a subsection, the contiguous total material swath surface that can be produced in a relative movement of the printhead at the setting angle $\alpha$ with the extrusion apertures in transverse direction to the movement direction, i.e. the maximum width of the closed surface that can be produced by the extrusion apertures transverse to the movement direction of the relative movement, can be set in difference to, or in relation to, a predefined minimum total width, also referred to as the target width, of the extrusion material in the subsection. The smaller the ratio is, the larger the penalty can be. In this way, the quality of the alignment of the shaped object is evaluated by means of the proportion of the desired or predetermined minimum total width in a subsection that can be produced within a single movement over the subsection.

A further preferred quality criterion includes as an evaluation parameter the proportion of the subsection or subsections which can be produced by parallel discharge of the extrusion material from the extrusion apertures with a swath width which is greater than the opening diameter of the extrusion apertures. The operating point of the printhead is determined by the relative position of the active extrusion apertures with respect to each other and the swath width required for the simultaneous extrusion of parallel swaths of material which are contiguous transversely to the relative movement. A relative swath width in relation to the opening diameter of greater than or equal to one is advantageous for the accuracy of the boundary of a material swath. As the relative extrusion width increases, the accuracy of the boundary decreases.

A further preferred quality criterion includes as an evaluation parameter the spacing of the extrusion apertures from one another perpendicular to the movement direction of the relative movement during the discharge of the extrusion material in at least one subsection. The position of the active extrusion apertures relative to each other in the movement direction and perpendicular thereto influences the extrusion behavior. All extrusion apertures positioned in front of their adjacent extrusion apertures in the movement direction freely produce material swaths. These extrusion apertures are positioned centrally over the width of the material swath. All other extrusion apertures extrude next to or between already existing material swaths. Depending on the positions of the extrusion apertures and the widths of the material swaths, situations can arise in which produced material swaths are forced to a lateral offset by already existing material swaths. The affected material swaths then no longer lie centrally under their extrusion apertures, which can lead to a reduced accuracy of the edging and/or the filling of the generated total material swath. This may occur, for example, when transitioning the use of one aperture row to the use of a second aperture row. The suitability of an operating point may therefore advantageously be evaluated by evaluating the spacing of the used extrusion apertures perpendicular to the direction of movement of the printhead. Equal distances are advantageous, unequal distances are disadvantageous, i.e. the quality function may, for example, include a penalty for unequal distances between the extrusion apertures perpendicular to the direction of relative movement.

Quality criteria can also be established for a change between contiguous subsections of one or more layers or surface sections of the shaped object. In principle, small changes in the operating point when changing between two subsections, such as the use of the same combination of active extrusion apertures and/or the same material swath widths in two contiguous sections, can be considered as good.

A preferred quality criterion includes as an evaluation parameter the number of extrusion apertures through which the extrusion material can be discharged without interruption during relative movement along contiguous subsections. If different combinations of extrusion apertures are used in two adjacent subsections to discharge the extrusion material, it is advantageous if as many of the extrusion apertures as possible form part of both combinations. Fewer starts and stops of the material extrusion are then required. A measure of suitability can be, for example, the ratio of extrusion apertures that are active in both subsections to the remaining extrusion apertures of the aperture row used.

A further preferred quality criterion includes as an evaluation parameter the difference and/or the ratio between different swath widths of the extrusion material produced with at least one of the extrusion apertures in two contiguous subsections. In order to keep the dynamics of the required material discharge per time low, it is advantageous if in two adjacent subsections the extrusion apertures used for discharging the extrusion material exhibit only small variations in the generated material swath width in both subsections. In this way, smaller initial deviations from the target widths of the extrusion material, which are predetermined along the subsection, are then achieved, or less compensation via the traversing speed of the printhead is required, respectively. In this respect, the quality function may include a penalty for large differences and/or ratios.

Finally, another preferred quality criterion includes as an evaluation parameter the number of events in which, after stopping the discharge of the extrusion material from one of the extrusion apertures during the relative movement of the printhead, said extrusion aperture is moved by the relative movement beyond an outer perimeter of the cross-section and/or of the shaped object. If the extrusion is not fully controllable, the material discharge cannot be completely stopped spontaneously. With respect to the surface quality produced, it is then advantageous if extrusion apertures do not move beyond the object periphery promptly after the material discharge has stopped. It is advantageous to select those orientations of the shaped object, in which these situations rarely occur.

Of course, any combination of the aforementioned quality criteria or evaluation parameters is also possible. Unless otherwise specified, the term "subsection" in this context can refer both to a part of a cross-section or to a part of a surface section.

It is possible to determine in step b10) several selected cross-sections through the shaped object, each of which is representative of a number of further cross-sections through the shaped object, e.g. because the cross-section occurs several times in the shaped object in an identical or at least approximately identical form. In this case, a weighting of the movement length can be carried out in step b12) on the basis of the number of cross-sections for which the respective cross-section is representative.

In preferred method variants, both embodiments for defining the angle of rotation of the shaped object about the z-axis are combined, wherein, for example, the angle of rotation is first defined using one or more of steps b6) to b9), and the angle of rotation is then defined using one or more of steps b10) to b12). In combination of both methods, a particularly accurate fine adjustment of the orientation of the shaped object can be achieved, which can result in an additional reduction of the process time.

Preferably, the program code means are configured to perform the printing task according to the method of the first aspect of the present invention. The combination of both processes results in synergy effects by which surprisingly large time savings can be achieved with respect to the process time required for the production of the shaped object.

In particularly preferred embodiments, the computer-implemented method further predicates that the printhead is configured in accordance with the following fourth or fifth aspect of the invention.

A third aspect of the invention relates to a computer-readable storage medium comprising a computer program which, when executed by a computer-based control device, causes the control device to perform the computer-implemented method of the second aspect.

According to a fourth aspect of the invention, a printhead for producing a three-dimensional shaped object is provided.

According to the invention, the printhead has a plurality of extrusion apertures for extruding an extrusion material, wherein a direct succession of at least a first, a second and a third extrusion aperture are arranged on an output side of the printhead in a linearly extending aperture row, or form a linearly extending aperture row, respectively. A direct succession in the sense of the invention is present if no further extrusion aperture is arranged in the linearly extending aperture row between the first and the second extrusion aperture and between the second and the third extrusion aperture, i.e., the first and the second extrusion aperture and the second and the third extrusion aperture each directly follow one another.

The printhead according to the present invention is characterized in that the first and the second extrusion apertures together with a further fourth extrusion aperture form a first triangular formation, and the second and the third extrusion apertures together with a further fifth extrusion aperture form a second triangular formation, wherein the first, second and fourth extrusion apertures of the first triangular formation and the second, third and fifth extrusion apertures of the second triangular formation, respectively, are arranged at substantially the same spacing from one another, or wherein their spacing differs by at most 10%, at most 7%, at most 5%, at most 3%, at most 2% or at most 1% from each other.

In the arrangement according to the present invention, the extrusion apertures on the output side of the printhead together form the vertices of at least two substantially equilateral triangles. In this way, the inventors achieve that the ranges of application of the extrusion apertures complement each other advantageously in various combinations, so that printing can be carried out with the printhead in a wide range of directions of movement without the need for a technically complex rotation of the printhead. In this way, the printhead according to the present invention solves the problem of achieving a reduction in the process time in 3D printing while at the same time simplifying and reducing the cost of the 3D printing device. In this regard, reference is also made to the following detailed description of embodiments.

In one embodiment, the fourth extrusion opening and the fifth extrusion opening are arranged on opposite sides of the aperture row. As a result, the fourth, second and fifth extrusion apertures form an additional aperture row that complements the range of application of the first aperture row. This extends the angular range of movements of the printhead without requiring rotation of the printhead. This is particularly advantageous in order to perform complex printing tasks with a limited number of extrusion apertures, with few movements of the printhead and in a short time. For example, the fourth and fifth extrusion apertures can be used in directions of movement extending at an angle of about 60° to about 120° relative to the linearly extending aperture row to fill the spaces between the first, second and third extrusion apertures. This is particularly advantageous for large aperture spacings.

In another embodiment, the fourth extrusion aperture and the fifth extrusion aperture are arranged on the same side of the aperture row.

According to a further development of this embodiment, the fourth and the fifth extrusion aperture together with a further sixth extrusion aperture form a third triangular formation, wherein the fourth, fifth and sixth extrusion aperture of the third triangular formation are arranged at the same spacing from each other or differ from each other in their spacing by at most 10%, at most 7%, at most 5%, at most 3%, at most 2% or at most 1%. The sixth extrusion aperture is arranged on that side of the fourth and fifth extrusion apertures which is opposite to the aperture row.

In another further embodiment, a further sixth and seventh extrusion aperture are arranged on a side of the aperture row opposite to the fourth and fifth extrusion apertures, wherein the first and second extrusion apertures together with the sixth extrusion opening form a third triangular formation and the second and third extrusion apertures together with the seventh extrusion opening form a fourth triangular formation, and wherein the first, second and sixth extrusion apertures of the third triangular formation and the second, third and seventh extrusion apertures of the fourth triangular formation, respectively, are arranged at the same spacing from one another or differ from each other in their spacing by at most 10%, at most 7%, at most 5%, at most 3%, at most 2% or at most 1%. The above embodiments have the advantage that the same printing geometry and the same total extrusion width can be produced with the printhead in different directions of travel relative to the orientation of the aperture row, without requiring any rotation of the printhead. In addition, in this arrangement there are three differently oriented linear aperture rows with three extrusion apertures each, which share a central extrusion aperture. In this way, when the use of the aperture rows is changed, the central extrusion aperture can be used continuously to discharge the extrusion material for producing an uninterrupted swath of material.

Preferably, the spacings between the extrusion apertures of the first and second triangular formations and, where present, the third and fourth triangular formations are the same or differ from each other by at most 10%, at most 7%, at most 5%, at most 3%, at most 2% or at most 1%. In other words, the first, second and, if present, the third and fourth triangular formations are substantially congruent with each other. In this way, a particularly advantageous complementation of the ranges of application of the extrusion apertures is achieved over a wide range of directions of movement, as is also apparent from the following detailed description of embodiment.

A fifth aspect of the invention relates to an alternative solution for a printhead for producing a three-dimensional shaped object.

According to the invention, the printhead has a plurality of extrusion apertures for discharging an extrusion material, wherein a direct succession of at least a first, a second, a third, a fourth and, optionally, a fifth extrusion aperture are arranged on an output side of the printhead in a linearly extending aperture row, or form a linearly extending aperture row, respectively.

The alternative solution is characterized in that the first and the second extrusion apertures are arranged at a first aperture spacing, the second and the third extrusion apertures are arranged at a second aperture spacing, the third and the fourth extrusion apertures are arranged at a third aperture spacing, and, optionally, the fourth and the fifth extrusion apertures are arranged at a fourth aperture spacing from each other, wherein the first and the second aperture spacing and/or the second and the third aperture spacing and/or, optionally, the third and the fourth aperture spacing differ from each other.

Due to the different distances of the extrusion apertures along the aperture row, it is also possible with this alternative solution to print in a wide range of movement directions by a combined use of different extrusion apertures without requiring a technically complex rotation of the printhead. For example, combinations of extrusion apertures that have a smaller aperture spacing from each other can be used for contour printing at larger relative traversing angles β, while combinations of extrusion apertures that have a larger aperture spacing from each other can be used for contour printing at smaller relative traversing angles β, or for printing of fill structures.

In a preferred embodiment, it is provided that the respective larger aperture spacing forms an integral multiple of the respective smaller aperture spacing. In particular, the first and the second aperture spacing may be equal to and/or smaller than the third aperture spacing. The third aperture spacing may in turn be smaller than the fourth aperture spacing. It has been shown that these aperture spacings enable a particularly versatile and efficient use of the extrusion apertures and lead to a reduced process time without significantly affecting the quality of the printed result. In this regard, reference is also made to the following detailed description of embodiments.

In preferred embodiments of the fourth and fifth aspects, the plurality of extrusion apertures of the printhead comprises at most or exactly twelve, at most or exactly ten, at most or exactly nine, at most or exactly eight, at most or exactly seven, at most or exactly six, at most or exactly five extrusion apertures. Preferably, the linearly extending row of apertures comprises at most or exactly five, at most or exactly four, at most or exactly three extrusion apertures. In this way, the advantages of the printheads already mentioned above can be combined with the advantages of a particularly compact, lightweight and low-maintenance printhead design.

Furthermore, the extrusion apertures in the aforementioned aspects of the invention are in principle not subject to any particular limitations with respect to their aperture diameter, cross-section and spacing. Suitable aperture diameters may, for example, be in a range from 0.05 mm to 10 mm, in particular in a range from 0.1 mm to 5.0 mm, preferably in a range from 0.2 to 2.0 mm. Particularly preferably, the aperture diameters are in a range from 0.4 mm to 0.8 mm. Such aperture diameters are intended, for example, for use in fused layer processes. It will be understood that other fields of application may require other aperture diameters, which can be readily determined by the skilled artisan. Furthermore, it is possible that the extrusion apertures arranged in the aperture row partially have different opening diameters. Preferably, the extrusion apertures have a round or circular or at least partially round or circular cross-section, although other cross-sectional shapes are of course also possible. The aperture spacing between two adjacent extrusion apertures from center to center can be, for example, 1.1 times to 30 times, and in particular 2 times to 15 times, the diameter of the extrusion apertures. Suitable distances for the melt layer process are, for example, in the range from 0.4 mm to 50 mm, in particular in the range from 0.8 mm to 20 mm.

In preferred embodiments, the printhead further comprises, for each extrusion aperture, a material inlet for receiving the extrusion material and a respective extrusion nozzle arranged between the material inlet and the extrusion aperture, which nozzle operatively or fluidically connects the material inlet and the extrusion aperture to one another. The material inlet is not particularly limited with respect to the type and nature of the extrusion material and may be configured, for example, to receive a quasi-endless, filamentary extrusion material or granules or a melt thereof. Preferably, the material inlet is configured to receive a filamentary extrusion material, and in particular each material inlet is configured to receive a separate filament. In order to control the supply of the extrusion material to the printhead, it is provided in certain embodiments that the printhead comprises a sensor adapted to measure and/or control a feed of the filamentary extrusion material to the material inlet. Among others, this has the advantage that a feed device for the extrusion material can be spatially decoupled from the printhead and the weight of the printhead can be reduced. In this way, the printhead can be operated economically even at high traversing speeds.

The printhead may further comprise a temperature control device configured to heat the received extrusion material in the printhead or in the extrusion nozzles, respectively.

The discharge of the extrusion material through the extrusion nozzles and/or from the extrusion apertures can be controllable, for example, via the above-mentioned control of the feed of the extrusion material to the printhead. Alternatively, or additionally, a valve may be arranged between the material inlet and the extrusion nozzle operably or fluidically connecting the material inlet and the extrusion aperture. Preferably, each valve is configured to selectively open and close the fluidic connection between the material inlet and the extrusion nozzle. The valves may be configured to discretely alternate between an open state and a closed state in one or more steps, or continuously. Further, the valves may be configured to apply a collective pressure level to the extrusion nozzles and/or an individual pressure level to each nozzle. Further, the printhead may include a controlling means operably connected to the valves and configured to actuate the valves to selectively discharge extrusion material from each extrusion aperture. Of course, it is also generally possible to actuate the valves collectively.

Finally, in a sixth aspect of the invention, an apparatus for producing a three-dimensional shaped object is provided.

The apparatus of the invention comprises a printing platform having a printing surface, a printhead for applying an extrusion material in a plurality of layers arranged one above another along a z-axis on the printing surface, a drive means configured to perform relative movements between the printhead and the printing surface during application in an x-axis and/or a y-axis of an x,y-axis plane extending perpendicular to the z-axis, and a computer-based control means operably connected to the drive means and configured to control application of the extrusion material in the layers superimposed along the z-axis on the printing surface.

The apparatus according to the present invention is characterized in that the computer-based control means is configured to perform a method according to the first aspect and/or second aspect of the present invention, and/or in that the printhead is configured according to the fourth or fifth aspect of the invention.

The apparatus can include a heating device configured to heat the printing platform and/or a printing space extending three-dimensionally above the printing surface.

It is understood that, to the extent applicable, preferred and advantageous embodiments of the first, second, third, fourth, fifth and sixth aspect of the present invention may also relate to any of the respective other aspects of the invention. Features disclosed hereinabove and hereinafter in connection with the methods according to the present invention may therefore also relate to the printheads according to the present invention or the apparatus according to the present invention, and vice versa.

BRIEF DESCRIPTION OF THE DRAWINGS

The invention is explained hereinafter in more detail by means of illustrative embodiments with reference to the enclosed drawings. These are merely schematic representations of principles and are to be understood as examples only. In no case is the invention intended to be limited to the illustrative embodiments and the figures shown. Unless otherwise indicated, identical reference signs in the figures stand for identical or analogous elements. For the sake of clarity, recurring features are sometimes not given a reference sign more than once.

DETAILED DESCRIPTION OF EMBODIMENTS

Figure 1:
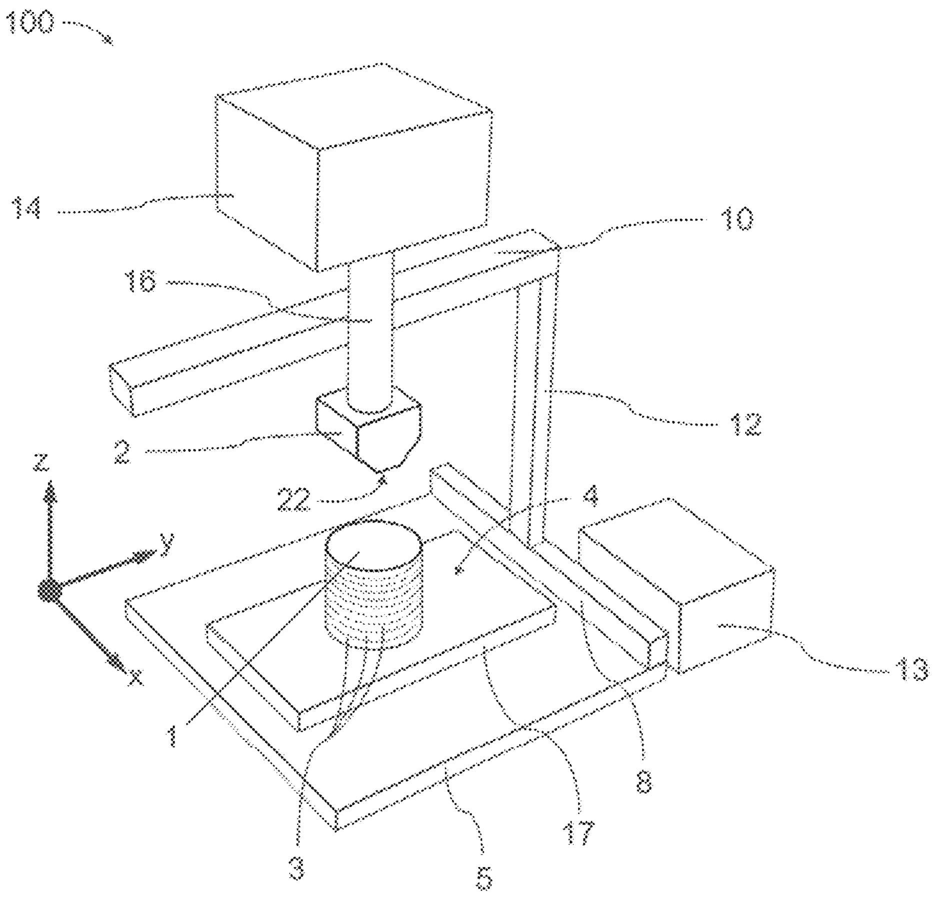
FIG. 1 an exemplary apparatus for the production of three-dimensional shaped objects.

FIG. 1 shows an overview of an exemplary apparatus 100 for the layer-by-layer production of a three-dimensional shaped object 1 in a Cartesian embodiment. In the example shown, the apparatus 100 is based on a standard 3-axis kinematic system with linear guides for moving a printhead 2 in the x-axis and/or y-axis of the x,y-axis plane relative to the printing surface 4 of a printing platform 5 with the aid of an x-axis actuator 8 and a y-axis actuator 10 for producing the layers 3 of the shaped object 1. The distance between the printhead 2 and the printing surface 4 is adjusted between two successive layers 3 via the z-axis actuator 12.

Of course, there can also be variations in the axis arrangement in order to implement the relative movements between the printhead 2 and the printing surface 4 in the z-axis and the x,y-axis plane as required by the invention, wherein it is not necessary that the x-, y- and z-axes in which the relative movements of the printhead take place and the respective actuator axes are aligned identically. For example, the print platform 5 may move along the z-axis. Alternatively, the printhead 2 may move in the x,z plane and the print platform 5 may move along the y axis. Other suitable kinematics using the polar coordinate system, multi-axis robotic arms or the like are known to the skilled artisan and are equivalently applicable to the present invention.

A material supply 14 and a material feed line 16 are arranged to provide the extrusion material 26 (not shown here), for example semi-finished material in the form of a quasi-endless filament or as granules, to the printhead 2 during the printing process. The extrusion material 26 is discharged on the output side 22 of the printhead 2. With the aid of a heating device 17, such as a heating plate, the temperature of the printing surface 4 and of the printing space extending thereabove can be adjusted, for example in order to improve the adhesion of the extrusion material 26 and/or to slow down the cooling.

Figure 2:
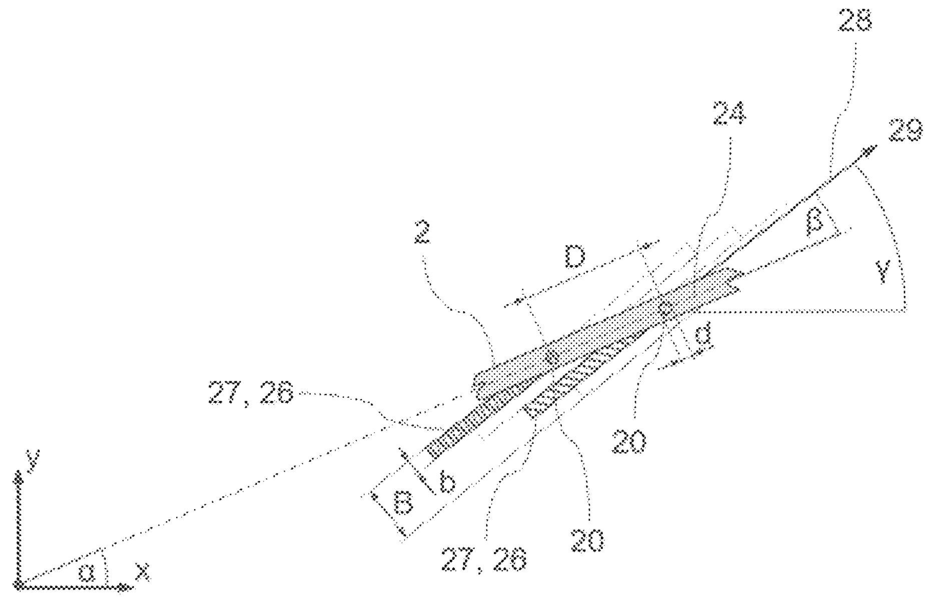
FIG. 2 a section of an aperture row of a printhead with two extrusion apertures in an exemplary arrangement in relation to the x,y-axis plane.

FIG. 2 shows a section of an exemplary multi-nozzle printhead 2 in an exemplary arrangement with respect to the x,y-axis plane during a printing operation. The section of the printhead 2 shows a linearly extending aperture row 24, which includes two extrusion apertures 20 having a diameter d. The extrusion apertures 20 are spaced apart by a distance D in the aperture row 24. With respect to the linearly extending aperture row 24, the printhead 2 is oriented at the setting angle α in the x,y-axis plane and is moved in the shown example by a relative movement 28 along the arrow in the movement direction 29 in the x,y-axis plane or relative thereto. The differential angle defined between the movement direction 29 of the relative movement 28 and the linearly extending aperture row 24 of the printhead 2 corresponds to the relative traversing angle β of the printhead 2. The global traversing angle $\gamma$ of the printhead 2 with respect to the x,y-axis plane is accordingly given by $\gamma=\alpha+\beta$. Due to the simultaneous discharge of the extrusion material 26 from the extrusion apertures 20 during the relative movement 28 of the printhead 2 in the movement direction 29, the extrusion material 26 is applied in parallel material swaths 27 of the swath width b on the printing surface 4 and/or one of the layers arranged thereon. The quotient b/d of the swath width b and the aperture diameter d is referred to as the "relative extrusion width". By one or more relative movements 28 of the printhead 2, a closed or fully filled area of the total extrusion width B can be produced. The relative traversing angle $\beta$ at which a closed surface is produced by single or multiple relative movements 28 of the printhead 2 is calculated according $$\beta = \sin^{-1}\frac{b\cdot m}{D},$$

where m is the number of relative movements 28 until full filling (in FIG. 2, m=2). The total extrusion width B of a closed surface, which can be produced by m-fold relative movements 28 of the printhead 2, is calculated according to $$B = b\cdot m\cdot n \text{ or } B = \sin\beta\cdot D\cdot n,$$

where n is the number of extrusion apertures 20 (in FIG. 2, n=2).

Figure 3A:
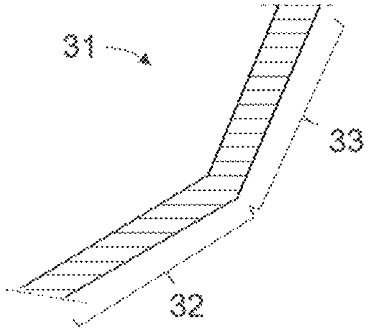
FIG. 3A an exemplary printing task.
Figure 3B:
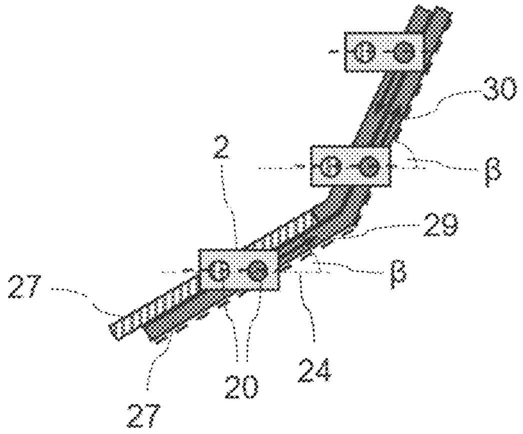
FIG. 3B an exemplary printing task operated in a conventional operation.
Figure 3C:
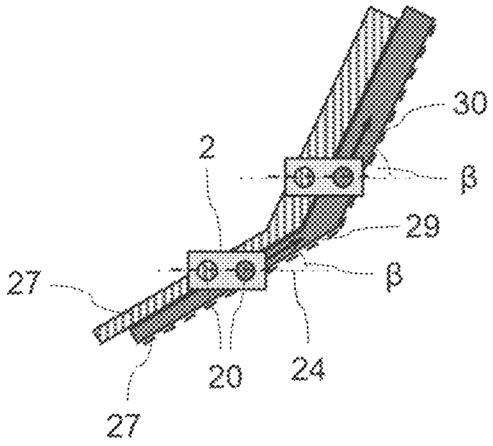
FIG. 3C an exemplary printing task in a method embodiment according to the present invention.
Figure 3D:
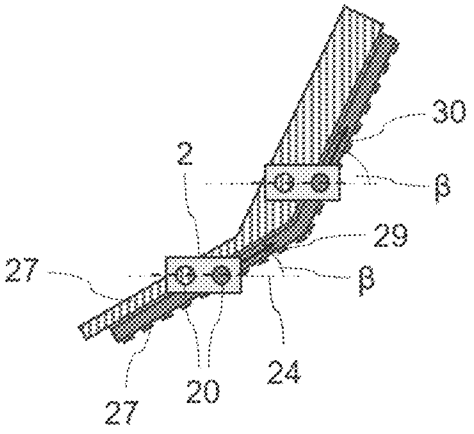
FIG. 3D an exemplary printing task in another method embodiment according to the present invention.

FIGS. 3A-3D show the execution of an exemplary 3D printing task (FIG. 3A) in conventional operation of a printhead 2 (FIG. 3B) compared to a printhead 2 operated in accordance with embodiments of the method of the present invention (FIG. 3C, FIG. 3D). The task is to produce two successive contour sections of different orientation, which are to obtain a closed total width B of at least two times the opening diameter d of the extrusion apertures 20. As is often the case in practice, it is assumed that only the outer material swath 27 must be true to size, whereas towards the inside a greater width may also be produced. For execution, the printhead 2 is moved in different movement directions 29, 30 along the print path 31, namely in a first movement direction 29 in a first subsection 32 of the print path 31 and a second movement direction 30 in a second subsection 33 of the print path 31 adjoining the first section 32. The printhead 2 on which the example is based has a linearly extending aperture row 24 with two extrusion apertures 20, wherein a setting angle $\alpha$ of 0° is assumed with respect to the aperture row, i. e. the printhead 2 is aligned parallel to the x-axis in each case. The setting angle $\alpha$ is invariable during the process. In the example, the subsections 32, 33 are to have an identical length of 100 mm.

FIG. 3B shows that when the printhead 2 is conventionally operated with a usual relative extrusion width which is constant b/d=1, both extrusion apertures 20 can be used in parallel only in the first subsection 32 to solve the printing task. In the second subsection 33, the relative traversing angle $\beta$ is greater than in the first subsection 32, so that when the extrusion material 26 is discharged in parallel from the extrusion apertures 20 with the relative extrusion width b/d=1, no closed surface of the required width can be produced in one relative movement. The second partial section 33 can therefore only be produced as required by moving the printhead 2 a number of times, wherein only a single extrusion aperture 20 can be used for the discharge of material. In this way, the printhead 2 has to travel a total distance of about 300 mm during the material discharge in order to complete the printing task.

This total distance can be considerably reduced with the aid of the method according to the present invention. FIG. 3C shows that by increasing the relative material discharge per travel distance through the two extrusion apertures 20 in the second movement direction 30, a closed surface of the required minimum width can also be produced in the second subsection 33 in a single relative movement. Alternatively, as FIG. 3D shows, the relative material discharge can also be increased only through a selected extrusion aperture 20 (in this case the extrusion aperture 20 arranged on the left in the aperture row 24) in order to produce a closed surface of the required minimum width through the two extrusion apertures 20 in the second movement direction 30 also in the second subsection 33 in a single relative movement. In this way, the two extrusion apertures 20 can be used simultaneously along the entire printing path 31 in a single continuous travel movement to complete the printing task. This reduces the total travel distance of the printhead 2 in operation according to the present invention to about 200 mm, corresponding to a saving of 33% compared to the conventional method.

Figure 4A:
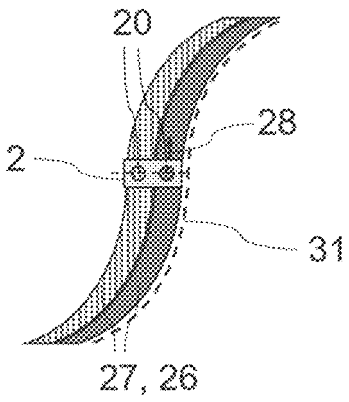
FIG. 4A an example of a method embodiment according to the present invention for producing a curved shaped object contour.
Figure 4B:
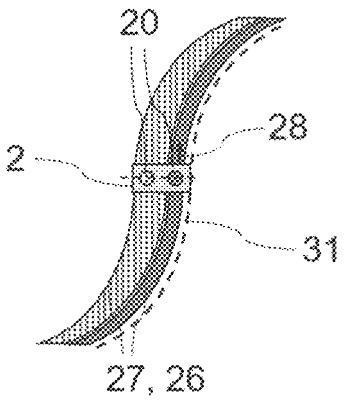
FIG. 4B an example of another method embodiment according to the present invention for producing a curved shaped object contour.

In addition, FIGS. 4A-4B show that with the method according to the present invention it is also possible for the first time to produce contours with different radii of curvature in a continuous movement of the printhead 2 along a print path 31 by continuously changing the movement direction of the printhead 2 in combination with a continuous increase or decrease in the relative material discharge of the extrusion material 26 from both extrusion apertures 20 (FIG. 4A) or one of the two extrusion apertures 20 (FIG. 4B), without necessity to rotate the printhead about its own axis for this purpose. In this way, complex structures can be produced in a particularly time-efficient and cost-efficient manner with the aid of the method according to the present invention.

Figure 5:
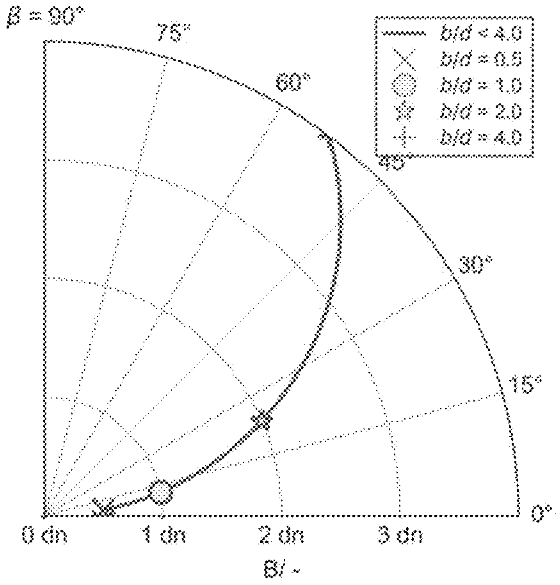
FIG. 5 a polar diagram showing the continuous variation possibility of the relative traversing angle β in relation to the total extrusion width that can be produced during operation of a printhead with uniformly spaced extrusion apertures according to the present invention.

The relationships are additionally shown in FIG. 5 for the case of a relative movement m=1 and a relative opening distance D/d=5 for a printhead 2 operated in accordance with the present invention. The polar diagram shows the total closed extrusion width B that can be generated as a function of the relative traversing angle $\beta$ and the relative extrusion width b/d. In this embodiment, by varying the relative extrusion width between 0.5 and 4.0, closed surfaces with total extrusion widths B up to four times the opening diameter of the extrusion apertures 20 can be generated at relative traversing angles $\beta$ of about 5° to about 50° within a single relative movement.

Figure 6:
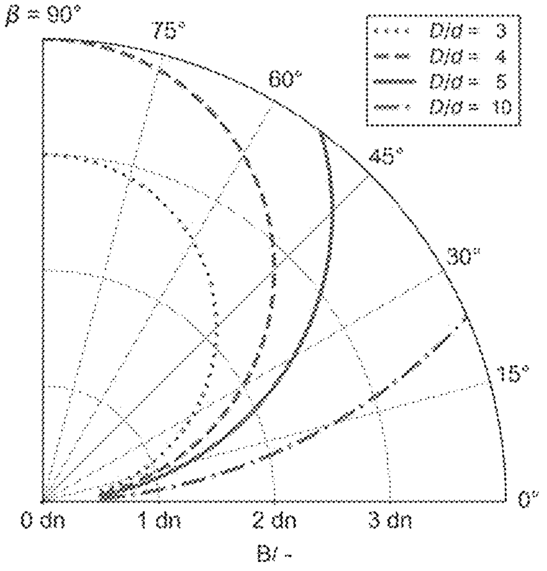
FIG. 6 a polar diagram showing the continuous variation possibility of the relative traversing angle β in relation to the total extrusion width B that can be produced during operation of a printhead with differently spaced extrusion apertures according to the present invention.

The present invention also allows the relative traversing angle $\beta$ and/or the total extrusion width B that can be generated to be adapted to the requirements of the printing task by selecting the relative aperture distances D/d (FIG. 6). The polar diagram shows the total closed extrusion width B that can be generated with a printhead 2 as a function of the relative traversing angle $\beta$ and the relative aperture distance D/d for the case of a relative movement m=1 and a variation in the relative extrusion width of $0<b/d<4$. It can be seen that, with the aid of relative aperture distances D/d between 3 and 10, it is possible to generate closed surfaces with the method according to the present invention over virtually the entire spectrum of possible relative traversing angles $\beta$ in a single relative movement. Embodiments with a large relative spacing of the extrusion apertures 20 are suitable, for example, for the production of filling structures (e.g. with a filling degree of about 10%). With small relative aperture spacings of, for example, D/d=3 or 4, a wide range of relative traversing angles β can be handled, for example for producing contours with straight sections of different orientation or with curved courses.

Figure 7:
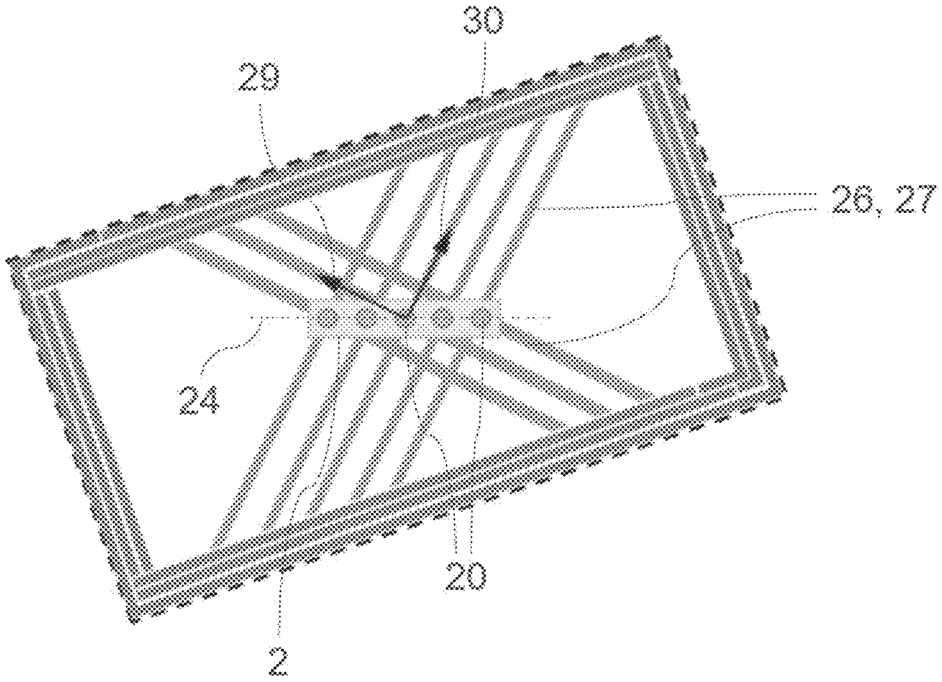
FIG. 7 an intermediary result of a method embodiment according to the present invention for generating filling structures.

FIG. 7 shows a further method embodiment according to the present invention by means of an exemplary generation of filling structures. Symmetrical objects may also require symmetry of the filling structure. If the object symmetry and the orientation of the aperture row 24 do not coincide, then in such cases the filling structure must also be rotated. As a result, the distances between the material swaths 27 of the extrusion material 26 also inevitably change as a function of the movement direction 29, 30 of the printhead 2. The method according to the present invention solves this problem by bringing the distances between the material swaths 27 closer together by using selected extrusion apertures 20 of the linear aperture row 24 and, at the same time, discharging the same amount of material relative to the swath distance by increasing or decreasing the relative material discharge. Thus, the stiffnesses of the resulting structure are matched in the directions of both material swaths 27. In the example shown, this is accomplished by using only every second extrusion aperture 20 in the linear aperture row 24 of the printhead 2 in the first movement direction 29, while all extrusion apertures 20 of the aperture row 24 are used in the second movement direction 30.

Figure 8:
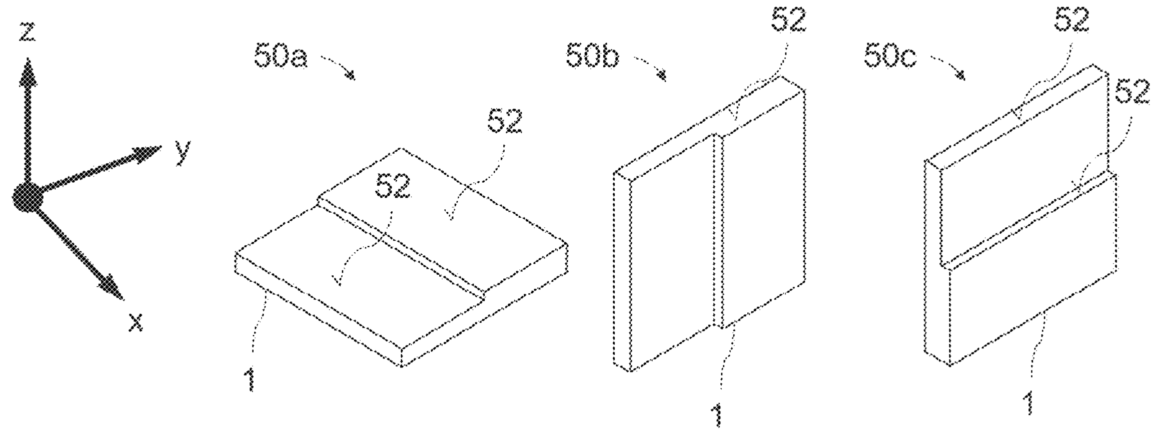
FIG. 8 exemplary intermediary results of the computer-implemented method according to the present invention with respect to the automated definition of the z-axis of a shaped object.

The computer-implemented method according to the present invention for controlling the printing of a three-dimensional shaped object 1 includes an automated definition of the z-axis of the shaped object 1 and an automated definition of a rotation angle of the shaped object 1 about the z-axis, which arranges the shaped object 1 in the x,y-axis plane. In FIG. 8, intermediary results of the automated definition of the z-axis are illustrated using a simplified exemplary shaped object 1 having an edge length of 100×100×10 mm and a recess of 100×50×5 mm. The shaped object 1 is arranged in three different virtual z-axis orientations 50*a*, 50*b*, 50*c* on the printing surface 4. If, as provided in a method embodiment according to the present invention, the surface portions 52 in the respective z-axis orientations 50*a*, 50*b*, 50*c* are projected along the z-axis onto the x,y-axis plane, a projection surface area, also referred to as "shadow area", of 20.000 $mm^2$ results for the z-axis orientation 50*a*, a projection surface area of 1,500 $mm^2$ results for the z-axis orientation 50*b* and a projection surface area of 2,000 $mm^2$ results for the z-axis orientation 50*c*. Accordingly, the method according to the invention provides for a definition of the z-axis based on the z-axis orientation 50*a* since it has the largest projection surface area. The inventors have recognized the advantage that in this way large cross-section surface areas are obtained, which ensure a high utilization of parallel extrusion through the extrusion apertures 20 of the printhead 2 at the setting angle α. At the same time, the layer-by-layer application of the extrusion material 26 results in relatively longer local cooling times until the application of the respective next layer 3, so that additional time lags for cooling, which are often required in space-saving arrangements such as in the z-axis orientations 50*b* and 50*c*, can generally be omitted.

Figure 9A:
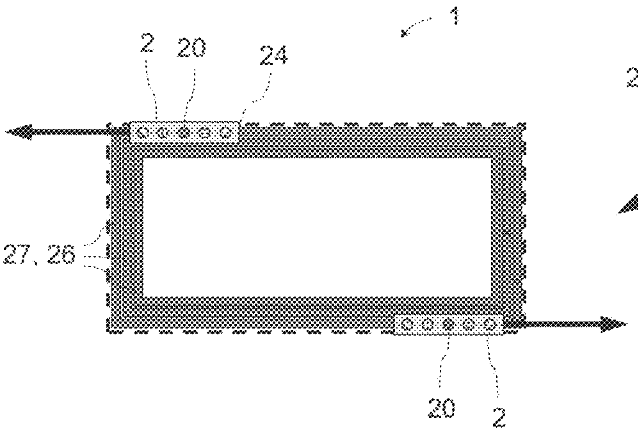
FIG. 9A an exemplary intermediary result of the computer-implemented method according to the present invention with respect to the automated definition of the angle of rotation of a shaped object about the z-axis.
Figure 9B:
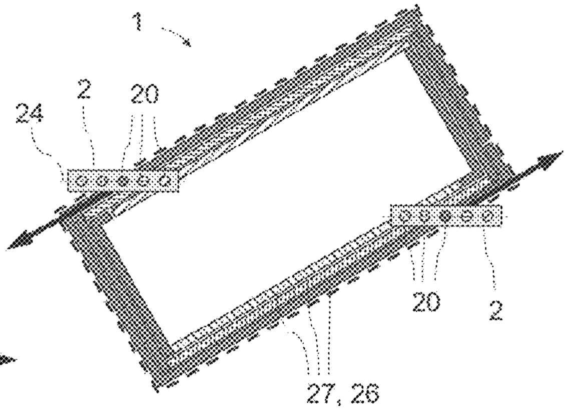
FIG. 9B another exemplary intermediary result of the computer-implemented method according to the present invention with respect to the automated definition of the angle of rotation of a shaped object about the z-axis.

FIGS. 9A and 9B show exemplary intermediary results of the computer-implemented method according to the present invention with respect to the automated definition of the angle of rotation of an exemplary shaped object 1 about the z-axis. The shaped object 1 is a simple rectangle with a long edge of 200 mm in length and a short edge of 100 mm in length, the wall thickness of which should correspond to at least three times the opening diameter d of the extrusion apertures 20 of the printhead 2. In the example shown, the z-axis extends in the direction of the viewer. In order to define the angle of rotation about the z-axis, as is provided in an embodiment of the method, the shaped object 1 is oriented about the z-axis at two different rotation angles according to FIGS. 9A and 9B, and in each case the distance of travel of the printhead 2 required to produce the section is determined for the setting angle α, which in the example shown is 0°. In the orientation shown in FIG. 9A, in which the long edges of the object 1 are parallel to the aperture row 24, the walls along the edges of the object 1 can only be formed by single extrusion, i. e. a discharge of the extrusion material 26 through a single extrusion opening 20. The walls must therefore be produced by multiple movements of the printhead 2. In this manner, there is a travel distance of about 1,800 mm required to produce the object section shown. In contrast, the orientation shown in FIG. 9B enables simultaneous discharge of the extrusion material 26 from three extrusion apertures 20 along the long edges of the rectangle with the printhead 2 in the setting angle α. In this way, the travel distance required for production is reduced to about 1,000 mm, which corresponds to a saving of 44% compared to the conventional orientation. In the present example, the angle of rotation about the z-axis would be defined using, or in the form of, the orientation shown in FIG. 9B, since the travel distance is of a shorter length here. The example illustrates on the basis of a shaped object 1 having a very simple geometry that a surprisingly high reduction in manufacturing time can be achieved with the aid of the method according to the present invention.

Figure 10:
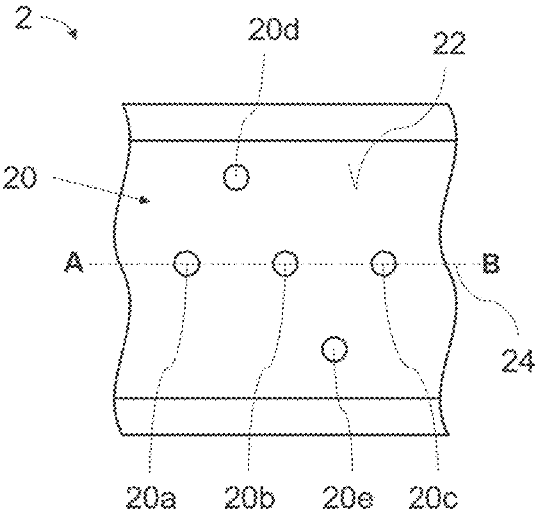
FIG. 10 a section of a printhead according to the present invention in plan view of the output side, FIG. 11A a sectional view of an embodiment of the printhead of FIG. 10 along the line of intersection A-B.

FIG. 10 shows a section of a printhead 2 according to the present invention in a top view of the output side 22. The section shown comprises five extrusion apertures 20, of which a first extrusion aperture 20*a*, a second extrusion aperture 20*b* and a third extrusion aperture 20*c* are evenly spaced in a linearly extending aperture row 24. A fourth extrusion aperture 20*d* forms a first triangular formation together with the first and second extrusion apertures 20*a*, 20*b*. A fifth extrusion aperture 20*e* is arranged on the opposite side of the aperture row 24 from the fourth extrusion aperture and forms a second triangular formation together with the second and third extrusion apertures 20*b*, 20*c*. The first, second and fourth extrusion apertures 20*a*, 20*b*, 20*d* and the second, third and fifth extrusion apertures 20*b*, 20*c* and 20*e* are each arranged at the same aperture distance D from each other. In this way, the extrusion apertures 20 form two congruent equilateral triangles. Among other advantages, this embodiment has the advantage that the extrusion apertures 20*d* and 20*e*, together with the central extrusion aperture 20*b*, form an additional linear aperture row which is rotated by about 60° with respect to the aperture row 24. In this way, this additional aperture row can be used in other geometric ranges than the aperture row 24 and can particularly advantageously complement its range of application (cf. FIG. 12).

Figure 11A:
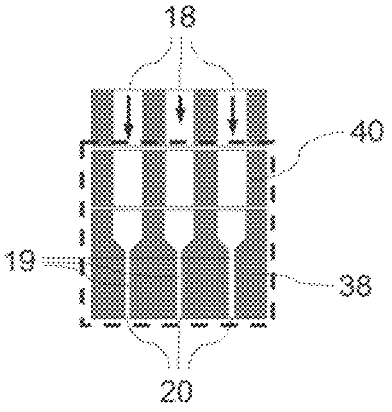
FIG. 11B a sectional view of another embodiment of the printhead of FIG. 10 along the line of intersection A-B.
FIG. 11C a sectional view of yet another embodiment of the printhead of FIG. 10 along the line of intersection A-B.
Figure 11B:
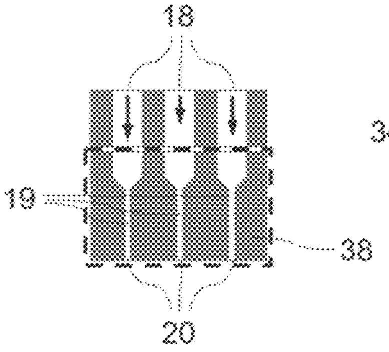
Figure 11C:
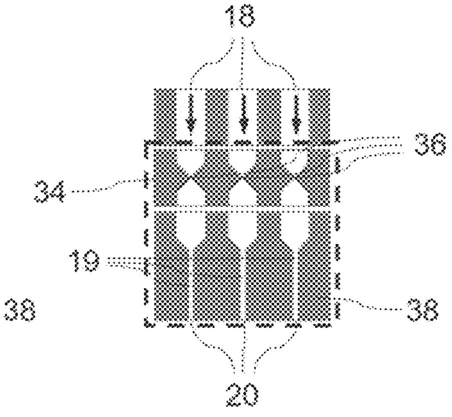

FIGS. 11A-11C show sectional views through the printhead 2 shown in FIG. 10 along the line of intersection A-B in different embodiments. FIG. 11A shows one embodiment provided for receiving a solid extrusion material 26. Via the material inlets 18, the extrusion nozzles 19 can be individually supplied with the extrusion material 26 (indicated here by the different lengths of the arrows), for example in order to increase or decrease the discharge of the extrusion material 26 from the extrusion apertures 20 as provided in the method according to the present invention. With the aid of the tempering device 38, the extrusion material 26 is heated in the printhead 2 to melt and is then extruded through the extrusion nozzles 19 via the extrusion apertures 20. A cooling device 40 prevents unwanted heating of the remaining parts of the printhead 2, with the purpose of leaving the fed extrusion material 26 in a solid state. FIG. 11B and FIG. 11C show variants of the printhead 2 for feeding extrusion material 26 in liquid form. The variant shown in FIG. 11B is provided for individual pressurization of the extrusion nozzles 19 (indicated by the different lengths of the arrows). The variant of the printhead 2 shown in FIG. 11C provides for application of a collective pressure to the extrusion nozzles 19, indicated by the uniform length of the arrows in FIG. 11C. A valve block 34 is arranged between the material inlets 18 and the extrusion nozzles 19. Each extrusion nozzle 19 is associated with a valve 36, which can be used to individually control the discharge of extrusion material 26 through the extrusion nozzles 19 from the extrusion apertures 20.

Figure 12:
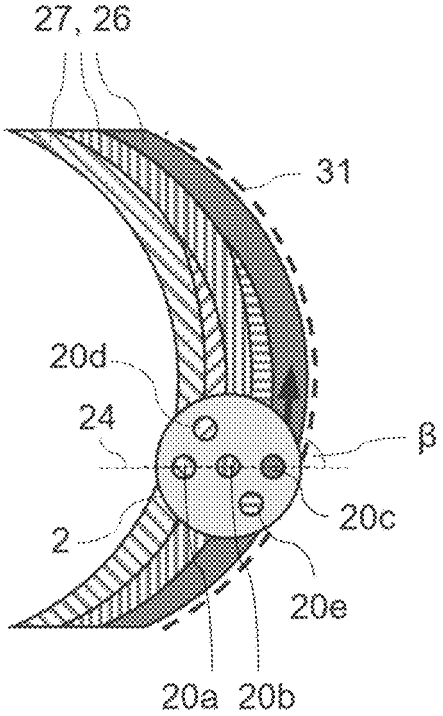
FIG. 12 an example of the generation of closed structures at large relative traversing angles β by operation of the printhead of FIG. 10 in accordance with the present invention.

FIG. 12 exemplarily illustrates the applicability of the printhead 2 shown in FIG. 10 in a continuous relative movement m=1, which comprises various movement directions of the printhead, with a constant setting angle $\alpha$ of 0° along the curved print path 31. Here, the particular advantage of the arrangement of the extrusion apertures 20 in equilateral triangles according to the present invention becomes apparent: The extrusion apertures 20*d*, 20*e* are located exactly in the interspaces between the extrusion apertures 20*a*, 20*b*, 20*c* when the relative traversing angle $\beta$ is 90°. This is still approximately the case for nearly equilateral triangles or relative traversing angles $\beta$ close to 90°. This is used with advantage if, for example, during performance of the method according to the invention the realizable swath width b of the material swaths 27 which can be produced with the extrusion apertures 20*a*, 20*b*, 20*c* is not sufficient to close all interspaces. It is then, as shown in the middle section of the print path 31, that the extrusion apertures 20*d*, 20*e* are selectively engaged to fill intermediate spaces at large relative traversing angles $\beta$. In this way, additional relative movements of the printhead 2 are avoided and the process time is considerably reduced. The particular advantage in the equilateral triangle arrangement is that for each aperture row present in the equilateral triangle, there is an extrusion aperture for filling the intermediate space. Since the ranges of application of the extrusion apertures 20*a* to 20*e* complement each other in an advantageous manner, the printhead 2 according to the present invention can be used to produce complex structures in a particularly time- and cost-efficient manner even with only a few extrusion apertures 20 and without rotating the printhead 2 about its own axis.

Figure 13:
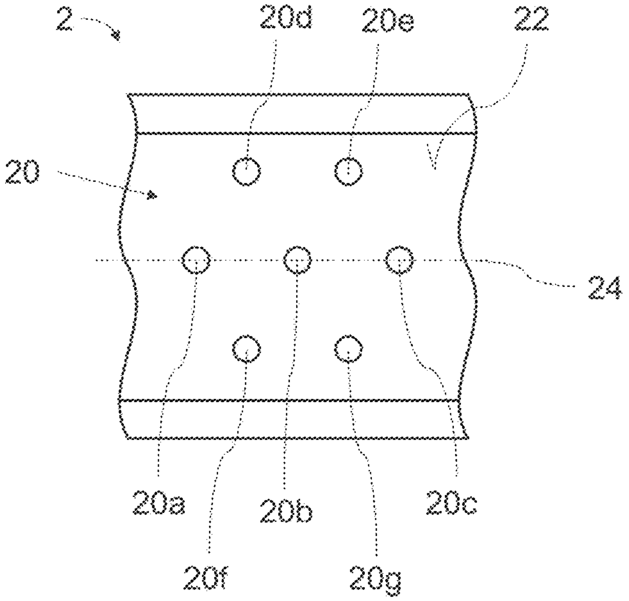
FIG. 13 a section of a further printhead according to the present invention in plan view of the output side.

FIG. 13 shows a section of a further printhead 2 according to the present invention in plan view of the output side 22. The section shown comprises seven extrusion apertures 20, of which a first extrusion aperture 20*a*, a second extrusion aperture 20*b* and a third extrusion aperture 20*c* are evenly spaced in a linearly extending aperture row 24. A fourth extrusion aperture 20*d*, together with the first and second extrusion apertures 20*a*, 20*b*, forms a first triangular formation; a fifth extrusion aperture 20*e*, disposed on the same side of the aperture row 24 as the fourth extrusion aperture, together with the second and third extrusion apertures 20*b*, 20*c*, forms a second triangular formation. An additional sixth and seventh extrusion apertures 20*f*, 20*g* are arranged on the side of the aperture row 24 opposite the fourth and fifth extrusion apertures 20*d*, 20*e*. The first and second extrusion apertures 20*a*, 20*b* together with the sixth extrusion aperture 20*f* form a third triangular formation, while the second and third extrusion apertures 20*b*, 20*c* together with the seventh extrusion aperture form a fourth triangular formation. The first, second and fourth extrusion apertures 20*a*, 20*b*, 20*d*; the second, third and fifth extrusion apertures 20*b*, 20*c* and 20*e*; the first, second and sixth extrusion apertures 20*a*, 20*b*, 20*f*; and the second, third and seventh extrusion apertures 20*b*, 20*c*, 20*g* are each arranged at the same aperture spacing D from each other. In this way, the extrusion apertures 20 form a plurality of congruent equilateral triangles.

Figure 14:
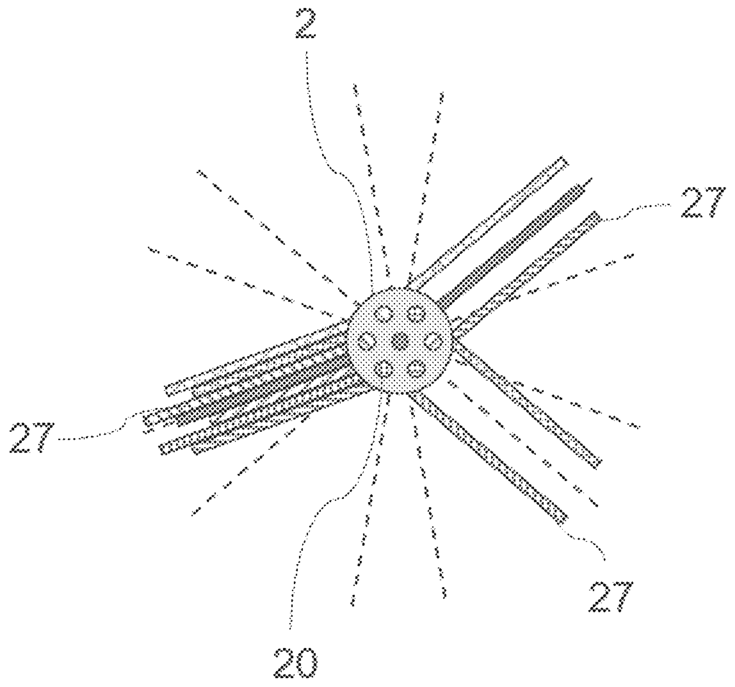
FIG. 14 illustrative examples of the operation of the printhead according to the present invention of FIG. 13.

The particular advantages resulting from this arrangement are illustrated by way of example in FIG. 14. Due to the fact that the extrusion apertures 20 form a total of three similar linear aperture rows 24 and the remaining extrusion apertures 20 are each located exactly in the interspaces of the extrusion apertures of the corresponding aperture row 24, it is already possible in conventional operation and without rotation of the printhead 2 to produce fully filled areas in twelve different directions of movement, indicated here by the dashed lines. Aperture rows 24 which are aligned approximately perpendicular to the movement direction can also be used advantageously in the same directions of movement for the production of partially filled areas, whereby degrees of filling in the range of 10-50%, for example, are possible.

Figure 15:
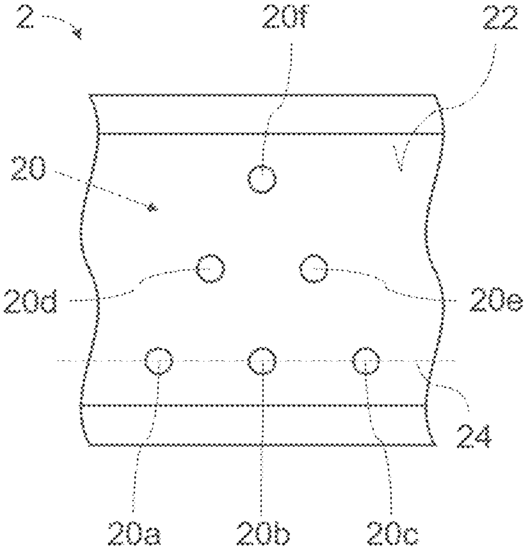
FIG. 15 a section of a further printhead according to the present invention in plan view of the output side.

FIG. 15 shows a section of a further printhead 2 according to the invention in plan view of the output side 22. The section shown comprises six extrusion apertures 20, of which a direct succession of a first extrusion aperture 20*a*, a second extrusion aperture 20*b* and a third extrusion aperture 20*c* are arranged at equal distances from one another in a linearly extending aperture row 24. A fourth extrusion aperture 20*d*, together with the first and second extrusion apertures 20*a*, 20*b*, forms a first triangular formation; a fifth extrusion aperture 20*e*, arranged on the same side of the aperture line 24 as the fourth extrusion aperture 20*d*, together with the second and third extrusion apertures 20*b*, 20*c*, forms a second triangular formation. An additional sixth extrusion aperture 20*f* is arranged on the side of the fourth and fifth extrusion apertures 20*d*, 20*e* opposite the aperture row 24 and together with the fourth and fifth extrusion apertures 20*d*, 20*e* forms a third triangular formation. The first, second and fourth extrusion apertures 20*a*, 20*b*, 20*d*; the second, third and fifth extrusion apertures 20*b*, 20*c* and 20*e*; and the fourth, fifth and sixth extrusion apertures 20*d*, 20*e*, 20*f* are each arranged at the same aperture spacing D from each other. In this way, the six extrusion apertures 20 together form an equilateral triangle whose vertices are formed by the extrusion apertures 20*a*, 20*f* and 20*c*.

Figure 16:
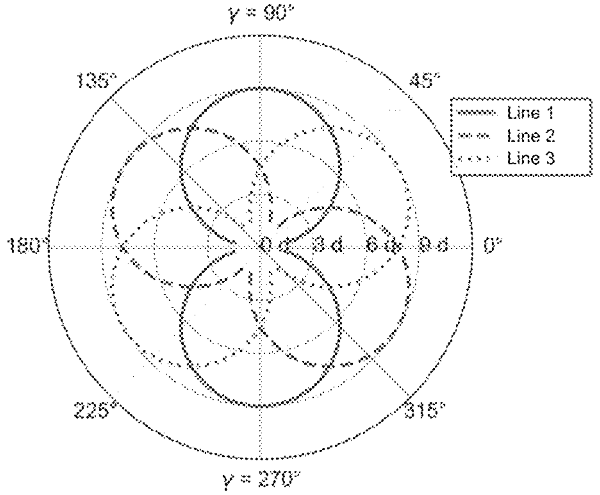
FIG. 16 a polar diagram showing the continuous variation possibility of the absolute traversing angle γ in relation to the total extrusion width B that can be generated during operation of a printhead according to the present invention as shown in FIG. 13 or FIG. 15.
Figure 17:
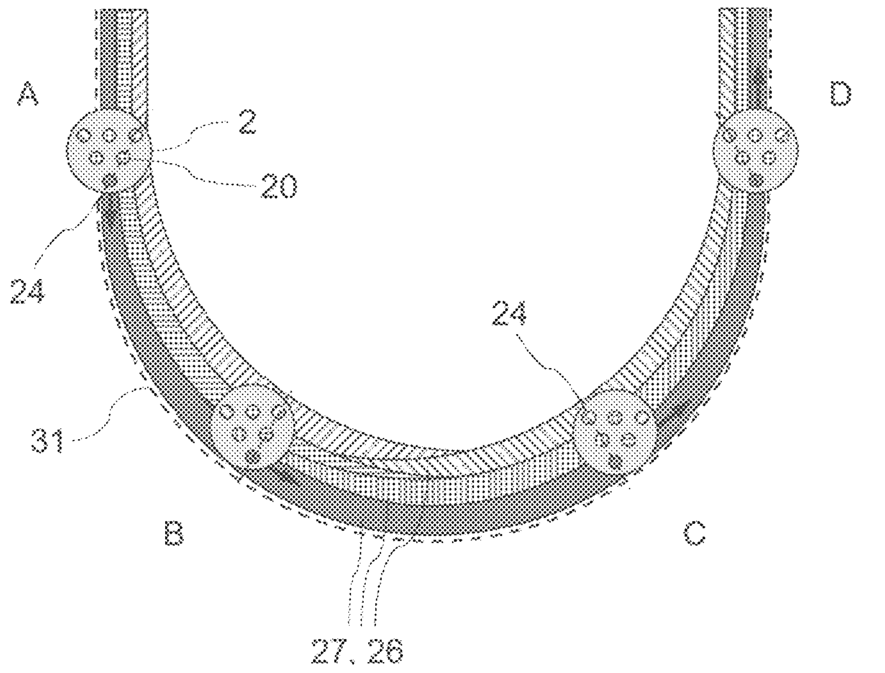
FIG. 17 an example of the generation of a curved object contour by operation of the printhead of FIG. 15 in accordance with the present invention.
Figure 18:
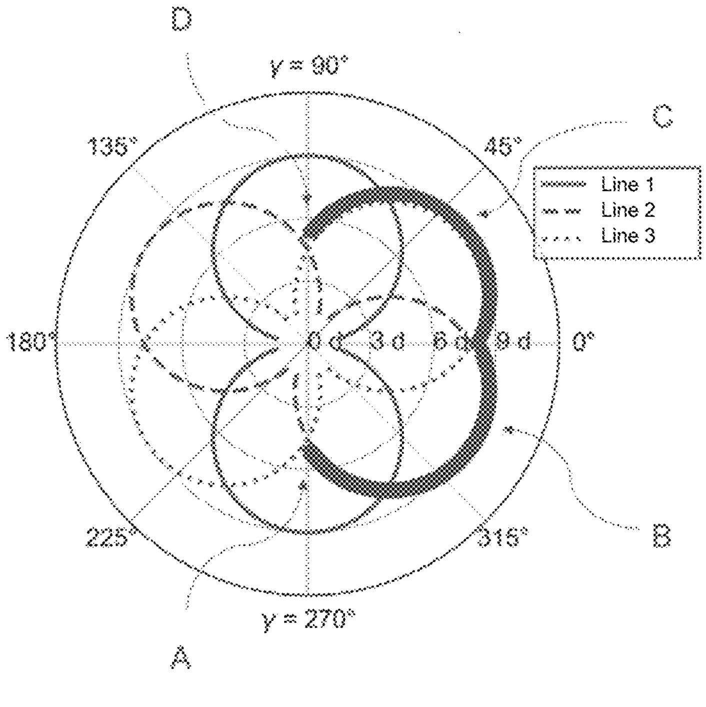
FIG. 18 the polar diagram from FIG. 16 with identification of the changing operating modes of the printhead during the production of the curved object contour according to the example from FIG. 17.

The particular advantages of this arrangement are illustrated in FIGS. 16 to 18. Firstly, the polar diagram in FIG. 16 illustrates the general possibility to operate the printhead 2 shown in FIG. 15 or the printhead 2 shown in FIG. 13, respectively, with the method of the present invention in any global traversing angle $\gamma$ with respect to the x,y-axis plane with continuous variation of the total extrusion width B which can be generated, wherein the example shown is based on a uniform relative aperture spacing of D/d=3 and a variation of the relative extrusion width of $0.5<b/d<4.0$. The aperture row 24 of the printhead 2 with the extrusion apertures 20*a*, 20*b*, 20*c* is arranged at a setting angle $\alpha$ of 0° in the x,y-axis plane. The global traversing angles $\gamma$ that are operable with these extrusion apertures 20*a*, 20*b*, 20*c* while varying the total width B are indicated by "Line 1" in the polar diagram. A second linear aperture row formed by the extrusion apertures 20*a*, 20*d*, 20*f* is arranged at a setting angle α of 60° in the x,y-axis plane. The global traversing angles γ printable with these extrusion apertures 20*a*, 20*d*, 20*f* while varying the total width B are indicated by "Line 2" in the polar diagram. A third linear aperture row formed by the extrusion apertures 20*c*, 20*e*, 20*f* is arranged at a setting angle α of 120° in the x,y-axis plane. The global traversing angles γ printable with these extrusion apertures 20*c*, 20*e*, 20*f* while varying the total width B are indicated by "Line 3" in the polar diagram.

FIG. 17 shows an example of how these properties of the printhead 2 can be used to advantage in the operation according to the present invention for generating a curved shaped object contour along the print path 31. In the partial section of the print path 31 extending between points A and B, a closed contour surface can be generated with the aid of the linear aperture row formed by the extrusion apertures 20*a*, 20*d*, 20*f* (Line 2). The partial section of the print path 31 extending between the points B and C is printed using both the linear aperture row formed by the extrusion apertures 20*a*, 20*d*, 20*f* (Line 2) and the linear aperture row formed by the extrusion apertures 20*c*, 20*e*, 20*f* (Line 3). In the portion of the print path 31 extending between points C and D, a closed contour surface can be produced solely with the aid of the linear aperture row formed by the extrusion apertures 20*c*, 20*e*, 20*f* (Line 3).

FIG. 18 again shows the polar diagram already known from FIG. 16, wherein the continuous change of the operating mode of the printhead 2 during the generation of the curved object contour shown in FIG. 17 has been indicated by highlighting the corresponding operating lines.

Figure 19:
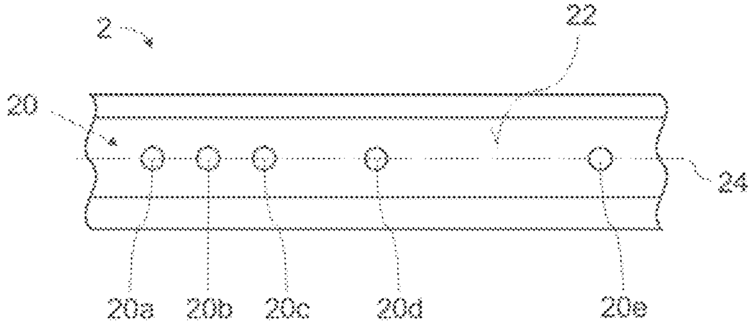
FIG. 19 a section of a further printhead according to the present invention in plan view of the output side.

FIG. 19 shows a section of a further printhead 2 according to the present invention in a top view of the output side 22. In the section shown, the printhead 2 comprises a direct succession of five extrusion apertures 20 arranged in a linearly extending aperture row 24. The first and second extrusion apertures 20*a*, 20*b* and the second and third extrusion apertures 20*b*, 20*c* each have the same aperture spacing D from each other. The aperture spacing D between the third and fourth extrusion apertures 20*c*, 20*d* is twice as large, and the aperture spacing D between the fourth and fifth extrusion apertures 20*d*, 20*e* is four times as large as the aperture spacing D between the extrusion apertures 20*a* and 20*b* and 20*b* and 20*c*, respectively. A printhead 2 in accordance with this embodiment has the advantage that the extrusion apertures 20 having a small aperture spacing can also be used for contours at relative traversing angles β of up to 90°, while the extrusion apertures 20 having a large aperture spacing can be used to produce partially filled areas at larger relative traversing angles β (e.g. >25°) and contours at smaller relative traversing angles β (e.g. <25°). By multiple relocation of the printhead 2, a uniform small relative spacing of the extrusion apertures 20 can be achieved. This enables all extrusion apertures 20 to be used when printing continuous surfaces.

Figure 20:
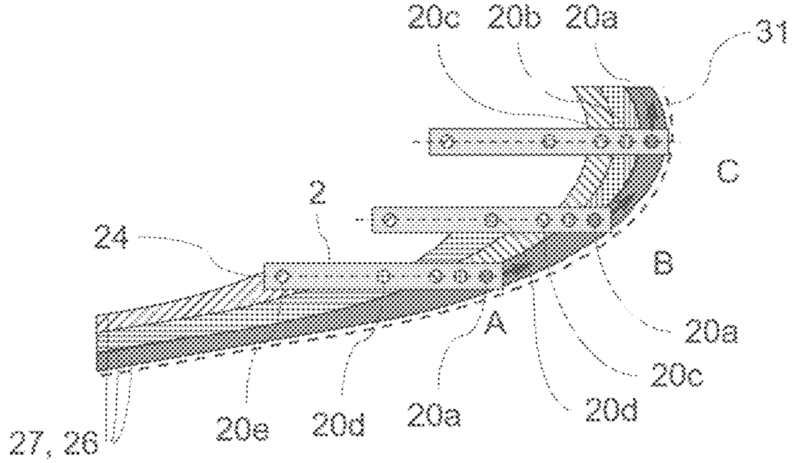
FIG. 20 an example of the generation of a curved object contour by operation of the printhead of FIG. 19 in accordance with the present invention.

FIG. 20 shows a schematic embodiment for generating a complex shaped object contour by operating the printhead 2 of FIG. 19 in accordance with the present invention. By selectively using the extrusion apertures 20*a*, 20*d*, 20*e* in a first subsection of the print path 31 up to point A, the extrusion apertures 20*a*, 20*c*, 20*d* in a second subsection up to point B, and the extrusion apertures 20*a*, 20*b*, 20*c* in a third subsection beyond point B, an approximately constant thickness of the object contour can be produced by means of the different aperture spacings of the extrusion apertures 20 along the entire print path 31 without repositioning or rotation of the printhead 2. Given that between each of the subsections only operation of a single extrusion aperture 20 is changed while the two other extrusion apertures 20 continuously discharge extrusion material 26, only one of three material swaths 27 is noncontinuous and a high quality of the shaped object structure is achieved.

Figure 21:
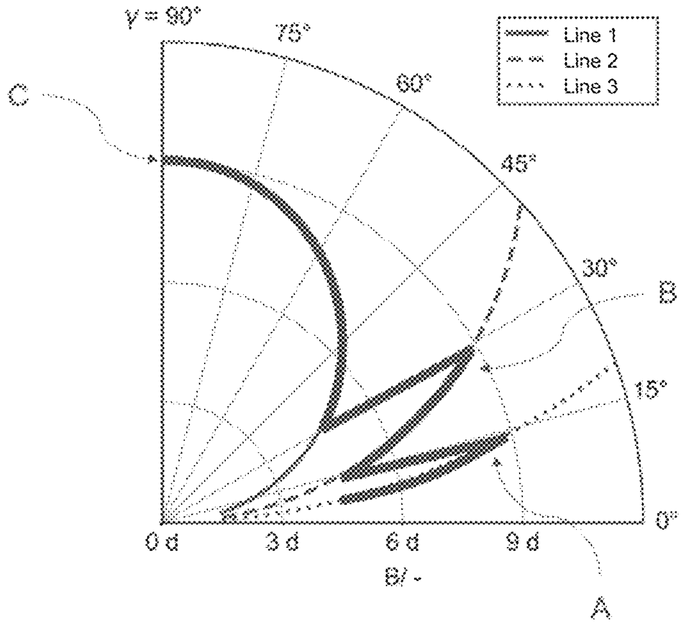
FIG. 21 a polar diagram for the continuous variation possibility of the relative traversing angle β in relation to the producible total extrusion width B during operation of the printhead according to the present invention from FIG. 19 with identification of the changing operating modes during the production of the curved object contour according to the example from FIG. 20.

In addition, FIG. 21 shows a corresponding polar diagram which is already known in a similar form from FIG. 6. The diagram shows for the printhead 2 of FIG. 19 with the setting angle α of 0° the total closed extrusion widths B that can be generated as a function of the relative traversing angle β for a relative movement m=1 and a variation in the relative extrusion width of 0<b/d<4.0. In the embodiment shown, a relative aperture distance between extrusion apertures 20*a*, 20*b*, 20*c* of D/d=3 ("Line 1"), between extrusion apertures 20*a*, 20*c*, 20*d* of D/d=6 ("Line 2"), and between extrusion apertures 20*a*, 20*d*, 20*e* of D/d=12 ("Line 3") was used. In addition, the continuous change of the operating mode of the printhead 2 during the generation of the curved shaped object contour shown in FIG. 20 has been indicated in the operating curves.

Figure 22:
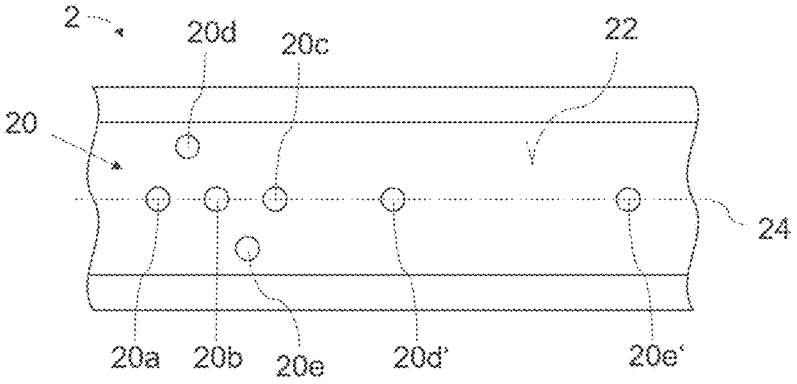
FIG. 22 a section of a further printhead according to the present invention in plan view of the output side.

Of course, the arrangements of extrusion apertures 20 according to the present invention can also be combined with each other in any order. For example, FIG. 22 shows a combination of the arrangements known from the printheads 2 of FIG. 10 and FIG. 19.

Figure 23A:
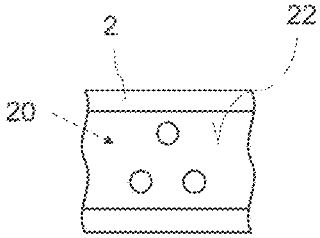
FIG. 23A a reference example for a further printhead in a plan view of the output side.
Figure 23B:
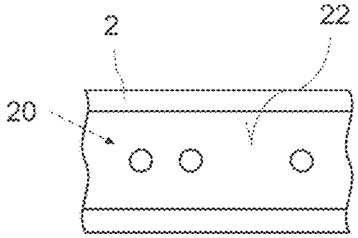
FIG. 23B a reference example for another further printhead in a plan view of the output side.
Figure 23C:
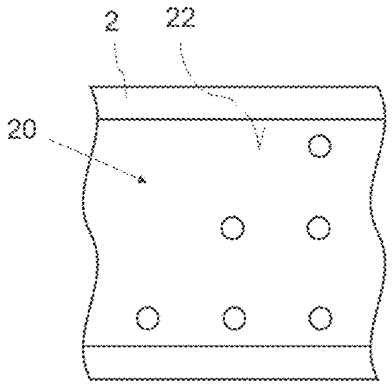
FIG. 23C a reference example for yet another further printhead in a plan view of the output side.

Finally, FIGS. 23A-23C show further embodiments of printheads which, although not forming an object of the present invention, can nevertheless be used to achieve some of the advantageous technical effects of the printheads 2 according to the present invention, in particular in connection with the method according to the first aspect of the present invention. FIG. 23A shows a reference printhead 2 with three extrusion apertures 20 arranged in an equilateral triangle. FIG. 23B shows a reference printhead 2 with three extrusion apertures 20, in which the aperture distance of the second and third extrusion apertures 20 is three times the aperture distance between the first and second extrusion apertures 20. FIG. 23C shows a reference printhead 2 with six extrusion apertures 20 arranged as a right-angled triangle.

Figure 24A:
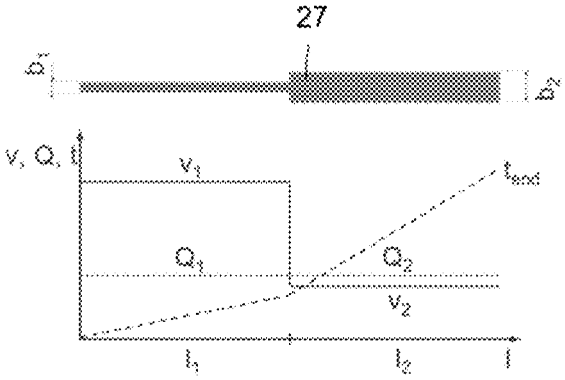
FIG. 24A a schematic, idealized diagrammatic representation of the travel speed v of the printhead, the material feed rate Q and the process time t during the production of a continuous material swath of length $l_1+l_2$ with different swath widths $b_1$ and $b_2$ by changing the travel speed v of the printhead.
Figure 24B:
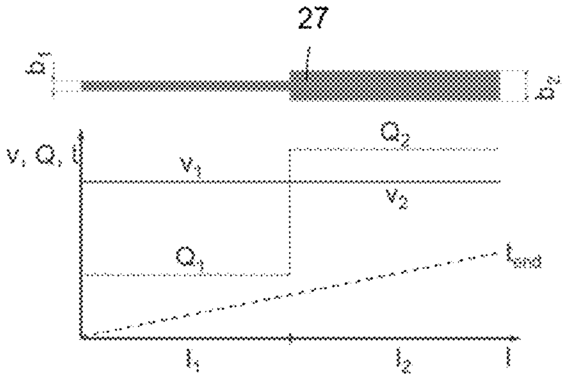
FIG. 24B a schematic, idealized diagrammatic representation of the travel speed v of the printhead, the material feed rate Q and the process time t during the production of a continuous material swath of length $l_1+l_2$ with different swath widths $b_1$ and $b_2$ by changing the material feed rate Q according to the present invention.

FIGS. 24A and 24B schematically illustrates the advantages of creating a widening material swath 27 with the aid of a change in the material feed rate Q (FIG. 24B) according to the present invention compared to a change in the traversing speed v of the printhead 2 (FIG. 24A). The material swath 27 extends over a first section with the length $l_1$ and a second section with the length $l_2$. The material swath 27 has a swath width $b_1$ in the first section and a swath width $b_2$ in the second section. The traversing speed v of the printhead, the material feed rate Q and the process time t are plotted over the travel path 1.

FIG. 24A shows a change in the swath width b of the material swath 27 by changing the traversing speed v of the printhead 2. Starting from a high traversing speed $v_1$ in the first section, the traversing speed in the second section is reduced to widen the material swath 27, while the material discharge per time Q remains unchanged. In the example shown, the traversing speed $v_2$ is reduced to one third of the speed $v_1$ in the first section. The disadvantage is that it takes three times longer to generate the material swath 27 in the second section than in the first section, and is thus at the expense of the total process time $t_{end}$. In addition, the swath widths b of further material swaths 27 produced in parallel (not shown here) are inevitably changed to the same extent.

If, on the other hand, the change in the swath width b of the material swath 27 is accomplished at a constant traversing speed v by a change in the material discharge per time Q according to the present invention, the first and second sections can be covered in the same time (FIG. 24B), so that the total process time $t_{end}$ is reduced. The method according to the present invention is therefore particularly advantageous for the operation of multi-nozzle printheads with the aim of reducing the process time. In addition, the swath widths b of further material swaths 27 deposited in parallel can be changed individually, for example, by applying individual material feed rates to the extrusion nozzles.

Figure 25A:
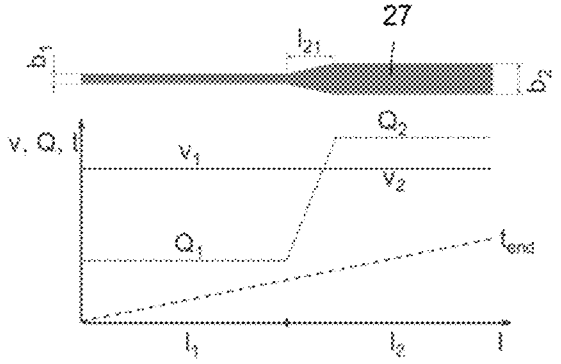
FIG. 25A a schematic diagrammatic representation of the travel speed v of the printhead, the material feed rate Q and the process time t during the production of a continuous material swath of length $l_1+l_2$ with different swath widths $b_1$ and $b_2$ by changing the material feed rate Q according to the present invention (A)

FIG. 25A shows the process that was idealized in FIG. 24B, taking into account a lag phase in the response of the material discharge per time that is often observed in practice. Given that the change in material discharge per time is typically not arbitrarily fast, the change in swath width b resulting from the increase in material discharge Q usually does not occur spontaneously, but drags on over a certain part of the second section of length $l_{21}$ due to a short time lag caused by technical reasons. In the partial section $l_{21}$ covered during the lag phase, the desired swath width $b_2$ of the material swath 27 is not yet achieved.

Figure 25B:
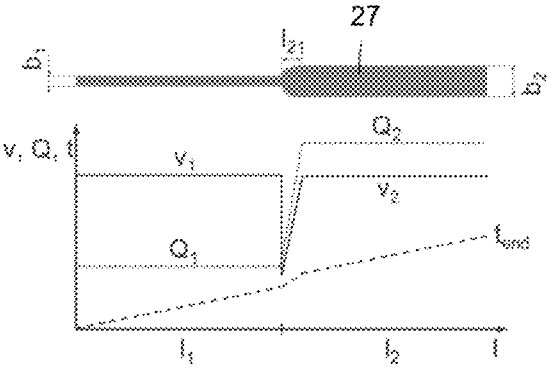
FIG. 25B a schematic diagrammatic representation of the travel speed v of the printhead, the material feed rate Q and the process time t during the production of a continuous material swath of length $l_1+l_2$ with different swath widths $b_1$ and $b_2$ by combining the change in the material feed rate Q and the travel speed v of the printhead according to the present invention.

In contrast, the change in the traversing speed v of the printhead is possible with a greater dynamic. It can therefore be used during the lag phase to systematically compensate changes in the material discharge per time Q that has not yet reached the desired level. As a result, the partial section $l_{21}$ in which the actually achieved swath width b of the material swath 27 is less than the desired one is shorter, as shown in FIG. 25B. Afterwards, with the desired material discharge per time $Q_2$ and the achieved traversing speed $v_2$, the same advantages of the method with changed material discharge per time arise that have already been discussed above with respect to FIG. 24B. The interaction of a change in the material discharge per time Q and a change in the traversing speed v of the printhead thus results in particular advantages of the method according to the present invention.

Figure 26:
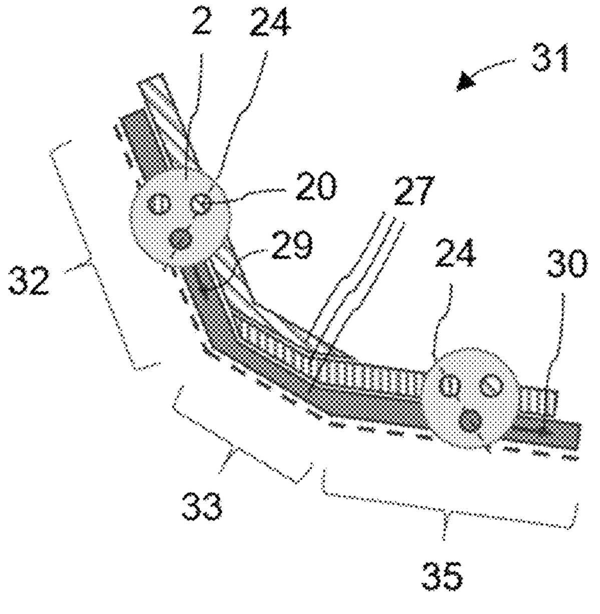
FIG. 26 an example of a method embodiment according to the present invention for the production of coherent subsections of different orientation by variable and combined use of aperture rows of the printhead.

FIG. 26 shows a printhead 2 with three extrusion apertures 20, of which two extrusion apertures 20 each form a linear aperture row 24 with different orientations with respect to the x,y-axis plane. In the example shown, this die arrangement is used to produce parallel swaths of extrusion material 27 along a print path 31 in three contiguous partial sections 32, 33, 35 of different orientations each. While two different aperture rows 24 are used in the first and third partial sections 32, 35, the extrusion apertures of both aperture rows 24 are used along the second partial section 33 in order, on the one hand, to be able to produce closed material swaths 27 along the second partial section 33 without making the swath width b of the material swaths 27 particularly large, and, on the other hand, to create a transition region between the corresponding exclusive use of the aperture rows 24 at the same time.

The arrangement of extrusion apertures 20 along an aperture row 24 permits variation of the direction of movement 29, 30 depending on the spacing of the extrusion apertures 20 in a limited angular range in relation to the aperture row 24 in which combinations of extrusion apertures 20 can be found which permit simultaneous extrusion of adjacent parallel swaths of material 27. The combination of aperture rows 24 of different orientations in a printhead 2 can then advantageously be used to extend the angular range of possible directions of movement 29, 30.

Combinations sharing a common extrusion aperture 20 are particularly advantageous. Here, when changing the use of the aperture rows 24, this extrusion opening 20 can be used continuously to produce an uninterrupted swath of material 27.

Particularly advantageous are arrangements in which the aperture rows 24 are oriented and their extrusion apertures 20 are spaced apart in such a way that the end of use of one aperture row 24 overlaps with the beginning of use of a further aperture row 24. Spaces between adjacent material swaths 27, which can be produced with one aperture row 24, are filled by the discharge of extrusion material 26 from extrusion apertures 20 of a further aperture row 24 (cf. FIG. 26 in the second partial section 33).

Furthermore, angular differences between adjacent aperture rows 24 are particularly advantageous in which the formation of transition areas as shown in FIG. 26 is possible when changing between adjacent aperture rows 24, and in this way the operable angular range extends to the full circle. This characteristic can be achieved, for example, in multi-nozzle printheads 2 by arranging three, four, five, six (as shown in FIG. 13), seven or eight extrusion apertures 20 in a regular polygon around a central extrusion aperture 20, so that the central extrusion aperture 20 together with surrounding extrusion apertures each form a plurality of linear aperture rows 24.

The invention is not limited to the embodiments of the detailed description. Rather, the invention encompasses any new feature as well as any combination of features, which in particular includes any combination of features described above, even if this feature or combination of features is not itself explicitly indicated in the description of embodiments.

LIST OF REFERENCE SIGNS

1 shaped object
2 printhead
3 layer
4 printing surface
5 printing platform
8 x-axis actuator
10 y-axis actuator
12 z-axis actuator
13 control means
14 material supply
16 material feed line
17 heating device
18 material inlet
19 extrusion nozzle
20 extrusion aperture
20*a* first extrusion aperture
20*b* second extrusion aperture
20*c* third extrusion aperture
20*d* fourth extrusion aperture
20*e* fifth extrusion aperture
20*f* sixth extrusion aperture
20*g* seventh extrusion opening
22 output side
24 aperture row
26 extrusion material
27 material swath
28 relative movement
29 first movement direction
30 second movement direction
31 print path
32 first partial section
33 second partial subsection
34 valve block
35 third partial section
36 valve
38 tempering device
40 cooling device
50*a* first z-axis orientation
50*b* second z-axis orientation

50*c* third z-axis orientation
52 surface portion
100 3D printing apparatus
α a setting angle
β relative traversing angle
γ global traversing angle
d aperture diameter
D aperture spacing
D/d relative aperture spacing
b swath width
b/d relative extrusion width
B total extrusion width
l length
m number of relative movements
n number of extrusion apertures
Q material feed rate
t process time
v traversing speed

The invention claimed is:

1. A method for producing a three-dimensional shaped object, comprising applying an extrusion material to a printing surface by a printhead in a plurality of layers arranged one above the other along a z-axis, and performing relative movements in an x-axis and/or a y-axis of an x,y-axis plane extending perpendicularly to the z-axis between the printhead and the printing surface during application, wherein the printhead has, on an output side facing the printing surface, at least one linearly extended aperture row with at least two extrusion apertures for extruding the extrusion material, and the printhead is arranged with respect to the aperture row at a setting angle in the x,y-axis plane, and wherein said relative movements comprises:

A) performing a relative movement with a first setting angle of the printhead in a first movement direction while simultaneously extruding the extrusion material through the at least two extrusion apertures of the aperture row, B) performing a relative movement with the first setting angle of the printhead in a second movement direction deviating from the first movement direction while simultaneously extruding the extrusion material through the at least two extrusion apertures from A), wherein in B), with one extrusion aperture of the at least two extrusion apertures in the second movement direction, a wider material swath or narrower material swath of the extrusion material is applied to the printing surface and/or one of the layers arranged thereon than with said one extrusion aperture of the at least two extrusion apertures in the first movement direction in A), wherein the extrusion of the extrusion material per time through said one extrusion aperture of the at least two extrusion apertures is changed to apply the wider material swath or narrower material swath of the extrusion material on the printing surface and/or on one of the layers arranged thereon, and wherein the at least two extrusion apertures are set to a different discharge of the extrusion material per time, so that they produce different material swath widths of the extrusion material from one another.

2. The method according to claim 1, wherein in B), additionally a change of the traversing speed of the printhead during the relative movement is performed in order to apply the wider material swath or narrower material swath of the extrusion material on the printing surface and/or on one of the layers arranged thereon.

3. The method according to claim 1, wherein the aperture row comprises at least three extrusion apertures arranged at a uniform aperture spacing from each other.

4. The method according to claim 1, wherein the at least two extrusion apertures are in direct juxtaposition in the aperture row.

5. The method according to claim 1, wherein at least one further extrusion aperture of the aperture row is arranged between the at least two extrusion apertures.

6. The method according to claim 1, wherein in B), with the at least two extrusion apertures in the second movement direction, a wider material swath or narrower material swath of the extrusion material is applied to the printing surface and/or one of the layers arranged thereon than in the first movement direction in A).

7. The method according to claim 3, wherein in B), simultaneous extrusion of the extrusion material is performed through a smaller number of extrusion apertures of the aperture row than in A), and in B), with at least two of the at least three extrusion apertures in the second movement direction, the wider material swath of the extrusion material is applied to the printing surface and/or one of the layers arranged thereon than in the first movement direction in A).

8. The method according to claim 1, wherein in A) and B), a simultaneous extrusion of the extrusion material through the at least two extrusion apertures of the aperture row is performed, and in B), with each of the at least two extrusion apertures of the aperture row in the second movement direction, the wider material swath of the extrusion material is applied to the printing surface and/or one of the layers arranged thereon than in the first movement direction in A).

9. The method according to claim 1, wherein the second movement direction extends in the x,y-axis plane at an amount-wise smaller traversing angle relative to the first setting angle than the first movement direction, and in the second movement direction, the narrower material swath of the extrusion material is applied to the printing surface—and/or one of the layers arranged thereon, or wherein the second movement direction extends in the x,y-axis plane at an amount-wise larger traversing angle relative to the first setting angle than the first movement direction, and the wider material swath of the extrusion material is applied to the printing surface and/or one of the layers arranged thereon in the second movement direction.

10. The method according to claim 1, wherein the wider material swath has a swath width that is 1.1 times to 5.0 times the diameter of the extrusion aperture and/or the swath width of the narrower material swath.

11. The method according to claim 1, wherein on the output side of the printhead, the at least two extrusion apertures of the aperture row comprise at least a first extrusion aperture, a second extrusion aperture, and a third extrusion aperture, wherein the first extrusion aperture and the second extrusion aperture, together with a fourth extrusion aperture, define a first triangular formation, wherein the second extrusion aperture and the third extrusion aperture, together with a fifth extrusion aperture, define a second triangular formation, and wherein the first extrusion aperture, the second extrusion aperture, and the fourth extrusion aperture of the first triangular formation; and the second extrusion aperture, the third extrusion aperture, and the fifth extrusion aperture of the second triangular formation; respectively, are arranged at an equal aperture spacing from one another or wherein the aperture spacings differ by at most 10%.

12. The method according to claim 1, wherein the relative movement in A) directly transitions into the relative movement in B).

13. A method for producing a three-dimensional shaped object, comprising applying an extrusion material to a printing surface by a printhead in a plurality of layers arranged one above the other along a z-axis, and performing relative movements in an x-axis and/or a y-axis of an x,y-axis plane extending perpendicularly to the z-axis between the printhead and the printing surface during application, wherein the printhead has, on an output side facing the printing surface, at least one linearly extended aperture row with at least two extrusion apertures for extruding the extrusion material, and the printhead is arranged with respect to the aperture row at a setting angle in the x,y-axis plane, and wherein said relative movements comprises:

A) performing a relative movement with a first setting angle of the printhead in a first movement direction while simultaneously extruding the extrusion material through the at least two extrusion apertures of the aperture row, B) performing a relative movement with the first setting angle of the printhead in a second movement direction deviating from the first movement direction while simultaneously extruding the extrusion material through the at least two extrusion apertures from A), wherein the relative movement in A) directly transitions into the relative movement in B), wherein in B), with one extrusion aperture of the at least two extrusion apertures in the second movement direction, a wider material swath or narrower material swath of the extrusion material is applied to the printing surface and/or one of the layers arranged thereon than with said one extrusion aperture of the at least two extrusion apertures in the first movement direction in A), wherein the extrusion of the extrusion material per time through one extrusion aperture of the at least two extrusion apertures is changed to apply the wider material swath or narrower material swath of the extrusion material on the printing surface and/or on one of the layers arranged thereon, and wherein the at least two extrusion apertures are set to a different discharge of the extrusion material per time, so that they produce different material swath widths of the extrusion material from one another.

14. The method according to claim 1, wherein said one extrusion aperture of the at least two extrusion apertures is only one extrusion aperture of the at least two extrusion apertures.

15. The method according to claim 1, further comprising C) performing at least one further relative movement with the first setting angle $\alpha$ of the printhead in a further movement direction deviating from the first and/or second movement direction with simultaneous extrusion of the extrusion material through the at least two extrusion apertures from step A) and/or step B).

* * * * *